(12) United States Patent
Mochizuki et al.

(10) Patent No.: US 8,646,953 B2
(45) Date of Patent: Feb. 11, 2014

(54) LIGHT GUIDING BODY AND LIGHT EMITTING DEVICE

(75) Inventors: Keiichi Mochizuki, Nagano (JP); Yoshinori Shinohara, Nagano (JP)

(73) Assignees: Nittoh Kogaku K.K. (JP); Koike, Yashuhiro (JP)

( * ) Notice: Subject to any disclaimer, the term of this patent is extended or adjusted under 35 U.S.C. 154(b) by 0 days.

(21) Appl. No.: 13/345,110

(22) Filed: Jan. 6, 2012

(65) Prior Publication Data

US 2012/0176800 A1 Jul. 12, 2012

(30) Foreign Application Priority Data

Jan. 11, 2011 (JP) ................................. 2011-003419

(51) Int. Cl.
*F21V 9/00* (2006.01)

(52) U.S. Cl.
USPC ..... 362/511; 362/97.1; 362/97.2; 362/217.05

(58) Field of Classification Search
USPC .................. 362/511, 97.1–97.4, 223, 217.05, 362/311.01, 311.11, 625; 349/62–65
See application file for complete search history.

(56) References Cited

U.S. PATENT DOCUMENTS

| 8,189,135 | B2 * | 5/2012 | Bae et al. ......................... 349/61 |
| 2008/0129927 | A1 * | 6/2008 | Hamada et al. .................. 349/65 |
| 2008/0205080 | A1 * | 8/2008 | Erchak et al. .................. 362/613 |
| 2009/0290380 | A1 * | 11/2009 | Meir et al. ..................... 362/623 |
| 2010/0002169 | A1 * | 1/2010 | Kuramitsu et al. ............. 349/65 |
| 2011/0025730 | A1 * | 2/2011 | Ajichi ............................ 345/690 |
| 2011/0170022 | A1 * | 7/2011 | Ikuta ............................. 348/790 |

FOREIGN PATENT DOCUMENTS

JP 2009-289697 A 12/2009

* cited by examiner

*Primary Examiner* — Britt D Hanley
*Assistant Examiner* — Kevin Quarterman
(74) *Attorney, Agent, or Firm* — Cantor Colburn LLP

(57) ABSTRACT

A light guiding body of this invention comprises a light incident surface arranged on one end side of a light guide member, a light reflecting surface arranged on another end side of the light guide member opposite to the light incident surface across the light guide member, and a light emitting surface, arranged on a side surface of the light guide member between the light incident surface and the light reflecting surface, through which light input from the light incident surface into the light guide member passes to outside, in which the light guide member is formed as a solid body and at least a part of the light guide member is made from light scattering guide material which contains light scattering particles.

13 Claims, 34 Drawing Sheets

Light Guiding Body = HSOT    Turbidity 0.98

Light Guiding Body =Transparent + PMMA

Light Guiding Body =Transparent PMMA at Lower part
HSOT at Upper part
Turbidity 2.0

LIGHT GUIDING BODY AND LIGHT EMITTING DEVICE

CROSS-REFERENCE TO RELATED APPLICATION

The present application is related to, claims priority from, and incorporates by reference Japanese Patent Application No. 2011-003419 filed on Jan. 11, 2011.

BACKGROUND OF THE INVENTION

1. Field of the Invention

The present invention relates to a light guiding body and a light emitting device.

2. Description of Related Art

Recently, due to a high power and highly efficient light emitting diode (LED), an LED illuminating device is practically used in place of an incandescent lamp. Since a light emitting section (filament) of an incandescent lamp is arranged in a space in a spherical shell of glass away from a base of the incandescent lamp, the incandescent lamp has light distribution characteristics in which light is emitted also to a back side of the base (direction opposite to a direction in which the filament is arranged relative to the base). On the other hand, a light emitting section of an LED illumination device is mounted on a substrate of the LED illumination device, the LED illuminating device has characteristics that the light is not easily emitted to a backward direction of the substrate (direction opposite to the direction in which the light emitting section is mounted relative to the substrate). As an example of related art for making light distribution characteristics of an LED illuminating device become similar to that of an incandescent lamp, JP2009-289697A discloses a configuration in which the light from an LED is guided by a light guiding body and a light source cover to be emitted to the backward direction of the substrate.

SUMMARY OF THE INVENTION

However, in order to emit the light from the LED to the back side of the substrate, it is required to reflect the light emitted forward from the LED backward. Such reflection of light causes a loss to the light amount so that emission efficiency, which is a rate of the light amount of the illumination light output through the light guiding body to the light amount emitted from the LED, is deteriorated. For example, in the art described in the above-mentioned related art document, since a light guiding unit is a cylindrical and transparent body, some of the light reflected by a reflecting unit returns to the LED or an LED substrate and is absorbed. Some of the light is locked in, or can not go out from, the light guiding body. Consequently, the emission efficiency is deteriorated.

The present invention aims to provide a light guiding body and a light emitting device capable of emitting illumination light backward from a substrate with suppressing deterioration in emission efficiency of light emitted from an LED passing through the light guiding body to outside as illumination light.

According to the present invention, there is provided a light guiding body, comprising: a light incident surface arranged on one end side of a light guide member; a light reflecting surface arranged on another end side of the light guide member opposite to the light incident surface across the light guide member; and a light emitting surface, arranged on a side surface of the light guide member between the light incident surface and the light reflecting surface, through which light input from the light incident surface into the light guide member passes to outside; in which: the light guide member is made as a solid body and at least a part of the light guide member is made from a light scattering guide material which contains light scattering particles.

In the light guiding body according to the present invention, it is preferable that the angle between the light emitting surface and a plane including the light reflecting surface is an acute angle.

In the light guiding body according to the present invention, it is preferable that the whole of the light guide member is made from the light scattering material.

In the light guiding body according to the present invention, it is preferable that turbidity of the light scattering material is not smaller than 0.3 and not larger than 6.5.

In the light guiding body according to the present invention, it is preferable that the light guide member comprises a light scattering guide layer made from the light scattering material and a transparent layer made from a transparent material, which does not contain the light scattering particle, and the transparent layer is arranged between the light scattering guide layer and the light incident surface.

In the light guiding body according to the present invention, it is preferable that the light incident surface is a concave surface hollowed in a conical surface-shape in shape on a side of the light reflecting surface.

The light guiding body according to the present invention may further comprise a circumference light guide portion around the light reflecting surface, which is connected to the light guide member and through which the light from the light guide member passes to the outside of the light guiding body.

it can be is preferable that the light incident surface is a concave surface hollowed in a conical surface-shape in shape on a side of the light reflecting surface According to the present invention, there is also provided a light emitting device, comprising: the above-mentioned light guiding body and a light source which allows light to be incident on the light incident surface of the light guiding body.

According to the present invention, it can be provided a light guiding body and a light emitting device capable of emitting illumination light backward from a substrate with suppressing deterioration in emission efficiency of light emitted from an LED passing through the light guiding body to outside as illumination light.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

[First Embodiment]

Configurations of a light guiding body 1 and a light emitting device 2 according to a first exemplary embodiment of the present invention are hereinafter described with reference to the drawings.

[Schematic Configuration of Light Emitting Device 2]

Figure 1:
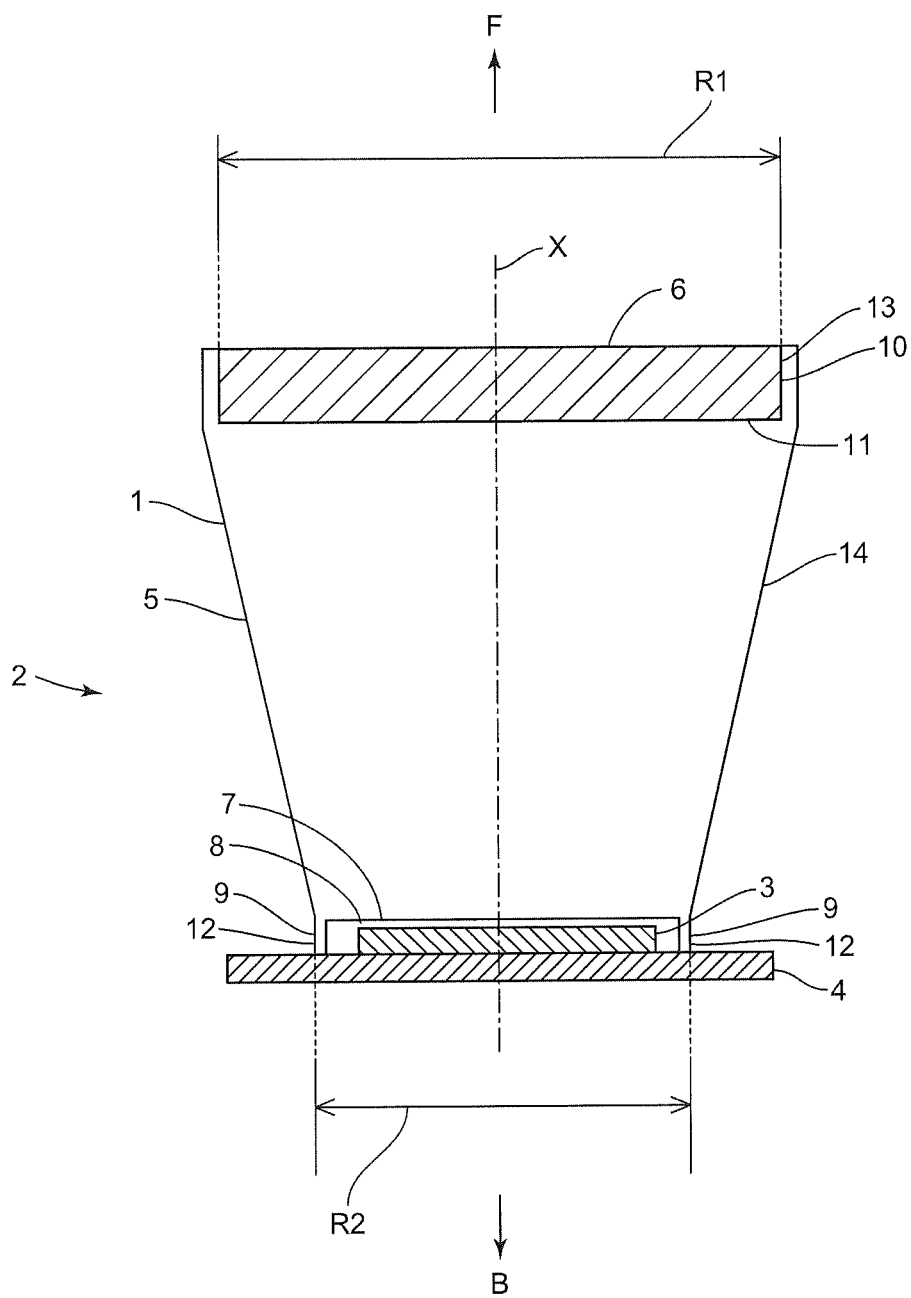
FIG. 1 is a cross-sectional view showing a light guiding body and a light emitting device according to a first exemplary embodiment of the present invention.
Figure 2:
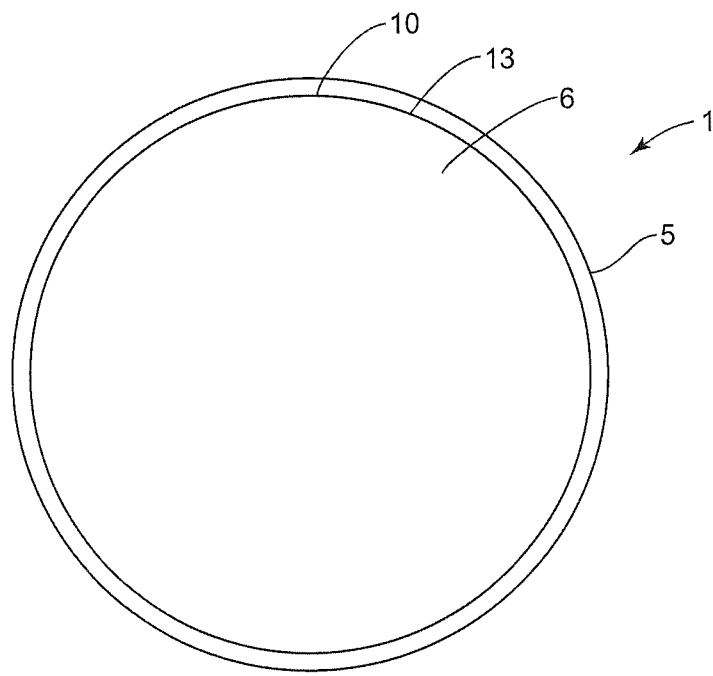
FIG. 2 is a front view of the light guiding body shown in FIG. 1 as seen from a front side.
Figure 3:
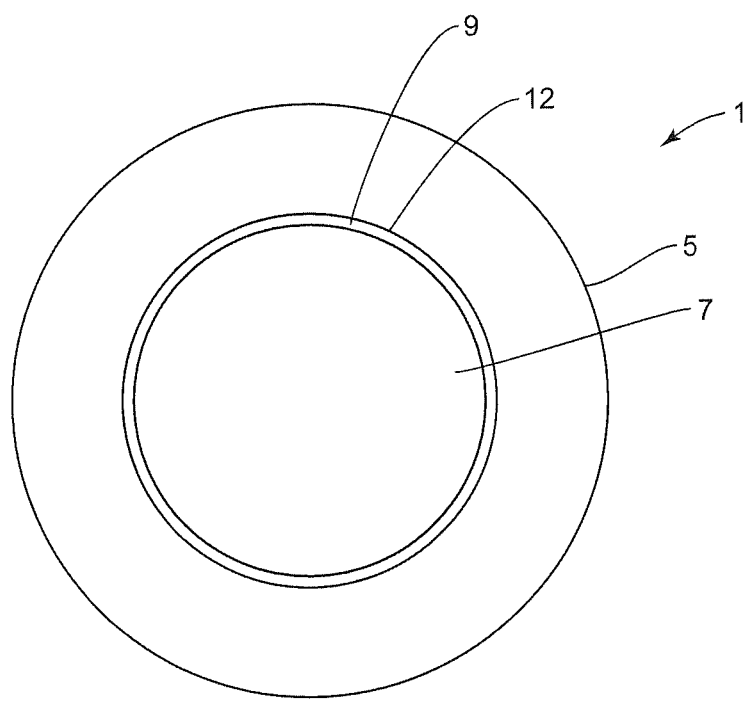
FIG. 3 is a back view of the light guiding body shown in FIG. 1 as seen from a back side.

FIG. 1 is a cross-sectional view showing a light guiding body 1 and a light emitting device 2 provided with the light guiding body 1 according to the exemplary embodiment of the present invention in a plane including the light axis X of the light guiding body 1. For convenience of description, it is hereinafter described by assuming that a direction indicated by an arrow F in FIG. 1 is a forward direction (front side), an opposite direction indicated by an arrow B is a backward direction (back side), and a direction orthogonal to the light axis X is a lateral direction. FIG. 2 is a front view of the light guiding body 1 seen from the front side and FIG. 3 is a back view of the light guiding body 1 seen from the back side. Meanwhile, when the light emitting device 2 is actually used, the front side of the light emitting device 2 shown in FIG. 1 may be directed in a desired direction such as upward or downward.

The light emitting device 2 comprises the light guiding body 1, an LED 3 as a light source, and an LED substrate 4 on which the LED 3 is mounted. The LED 3 is mounted on the LED substrate 4 and is capable of emitting light by means of power supplied from a power source unit not shown. The light emitting device 2 is configured to be able to emit the light emitted from the LED 3 around the light guiding body 1 through the light guiding body 1. In the light emitting device 2 according to this embodiment, the LED 3 includes a plurality of light emitting sections (LED chips) and each of the light emitting sections is covered with a resin material in which a fluorescent material is mixed. Therefore, the LED 3 may emit the light from a light emitting unit in a near surface-emitting state as a whole.

The light guiding body 1 comprises a light guide member 5 capable of transmitting the light and a light reflecting member 6, which reflects the light. Meanwhile, in FIG. 1, in FIG. 5 to be described later and the like, hatching of a cross-sectional portion of the light guide member 5 is not shown in order to make rays of light such as a ray L1A more visible. The light guide member 5 is made from a light scattering guide material such as a polymethylmethacrylate (PMMA) resin containing light scattering particles to be described later. It should be noted that PMMA itself is colorless and transparent. The light guide member 5 may also be formed of a resin or resins such as polyethylene terephthalate (PET), polycarbonate (PC), or benzyl methacrylate in place of PMMA. A shape of the light guide member 5 is a rotational body obtained by rotating a cross section shown in FIG. 1 around the light axis X as a rotational axis and the shape is such that an area of the cross section orthogonal to the light axis X continuously increases from the back side toward the front side. That is to say, the light guide member 5 has a so-called circular truncated cone-shape of which diameter increases from the back side toward the front side.

A light incident surface 7 is formed on a back end of the light guide member 5. The light guide member 5 is attached to the LED substrate 4 so as to have a slight air layer 8 between the LED 3 and the light incident surface 7. A convex line portion 9 provided so as to be extended in a projecting manner toward the back side is formed on an edge of an outer periphery of the light incident surface 7. The light guide member 5 is supported relative to the LED substrate 4 on the convex line portion 9. The convex line portion 9 is fixed to the LED substrate 4 by an adhesive, for example, and according to this, the light guide member 5 is fixedly attached to the LED substrate 4. The convex line portion 9 may be formed across an entire outer periphery of the light incident surface 7 or may be partially formed. When the convex line portion 9 is partially formed, it is preferable that this is formed at regular intervals around the light axis X such that the light guide member 5 is stably supported relative to the LED substrate 4.

The light reflecting member 6 is arranged on a front end of the light guide member 5. The light reflecting member 6 is made from a highly reflective white polycarbonate material, for example, so as to have a disk-like shape. A circular concave portion 10 hollowed backward from a front end surface is formed on the front end of the light guide member 5 and the light reflecting member 6 is fitted into the concave portion 10. The light reflecting member 6 is such that a back end surface thereof is formed as a light reflecting surface 11. Therefore, in a state in which the light reflecting member 6 is fitted into the concave portion 10, the light incident on the light reflecting surface 11 from the light guide member 5 is reflected again on a side of the light guide member 5. A diameter R1 of the light reflecting surface 11 is larger than a diameter R2 of a back end edge 12 of the light guide member 5. That is to say, the light guiding body 1 is configured such that an outer peripheral edge 13 of the light reflecting surface 11 juts laterally from the back end edge 12.

The light guide member 5 contains the light scattering particles capable of performing multiple scattering of the light and is configured as a light scattering guide member. The light scattering particles may be silicone particles to be described hereinafter, for example. The light guide member 5 is a light guiding body to which scattering power is given uniform in volume and contains a great number of spherical particles as the light scattering particles. When the light enters the light guide member 5, the light is scattered by the silicone particles (light scattering particles).

It will be explained about the Mie scattering theory, which gives theoretical basis of the light scattering particles (silicone particles). The Mie scattering theory is a solution to Maxwell's electromagnetic equation for a case where spherical particles (light scattering particles) are present in the matrix having a uniform refractive index and the particles have a refractive index different from that of the matrix. Intensity distribution I (A, Θ) of light scattered by the spherical particles depends on the angle and is represented by the following equation (1). "A" represents a size parameter indicating an optical size of the light scattering particles and this is an amount corresponding to the radius "r" of the spherical particles (light scattering particles) standardized by the wavelength λ of the light in the matrix. "Θ" is a scattering angle and a direction identical to the propagation direction of incident light is at Θ=180 degrees.

The terms "$i_1$" and "$i_2$" in the equation (1) are represented by the equation (4). The terms "$a_v$" and "$b_v$" in the equations (2) to (4) are represented by the equation (5). The term $P_v^1(\cos \Theta)$ represents a polynomial of Legendre, the terms "$a_v$" and "$b_v$" are composed of primary and secondary Recatti-Bessel functions $\Psi_v$ and $\zeta_v$ derived functions thereof. The term "m" represents a relative refractive index of the light scattering particles normalized by the refractive index of the matrix and is described as $m = n_{scatter}/n_{matrix}$.

$$I(A, \Theta) = \frac{\lambda^2}{8\pi^2}(i_1 + i_2) \tag{1}$$

$$K(A) = \left(\frac{2}{\alpha^2}\right)\sum_{v=1}^{\infty}(2v+1)(|a_v|^2 + |b_v|^2) \tag{2}$$

$$A = 2\pi r/\lambda \tag{3}$$

$$i_1 = \left|\sum_{v=1}^{\infty} \frac{2v+1}{v(v+1)}\left\{a_v \frac{P_v^1(\cos\Theta)}{\sin\Theta} + b_v \frac{dP_v^1(\cos\Theta)}{d\Theta}\right\}\right| \tag{4}$$

$$i_2 = \left|\sum_{v=1}^{\infty} \frac{2v+1}{v(v+1)}\left\{b_v \frac{P_v^1(\cos\Theta)}{\sin\Theta} + a_v \frac{dP_v^1(\cos\Theta)}{d\Theta}\right\}\right|$$

$$a_v = \frac{\Psi_v'(mA)\Psi_v(A) - m\Psi_v(mA)\Psi_v'(A)}{\Psi_v'(mA)\zeta_v(A) - m\Psi_v(mA)\zeta_v'(A)} \tag{5}$$

$$b_v = \frac{m\Psi_v'(mA)\Psi_v(A) - \Psi_v(mA)\Psi_v'(A)}{m\Psi_v'(mA)\zeta_v(A) - \Psi_v(mA)\zeta_v'(A)}$$

Figure 4:
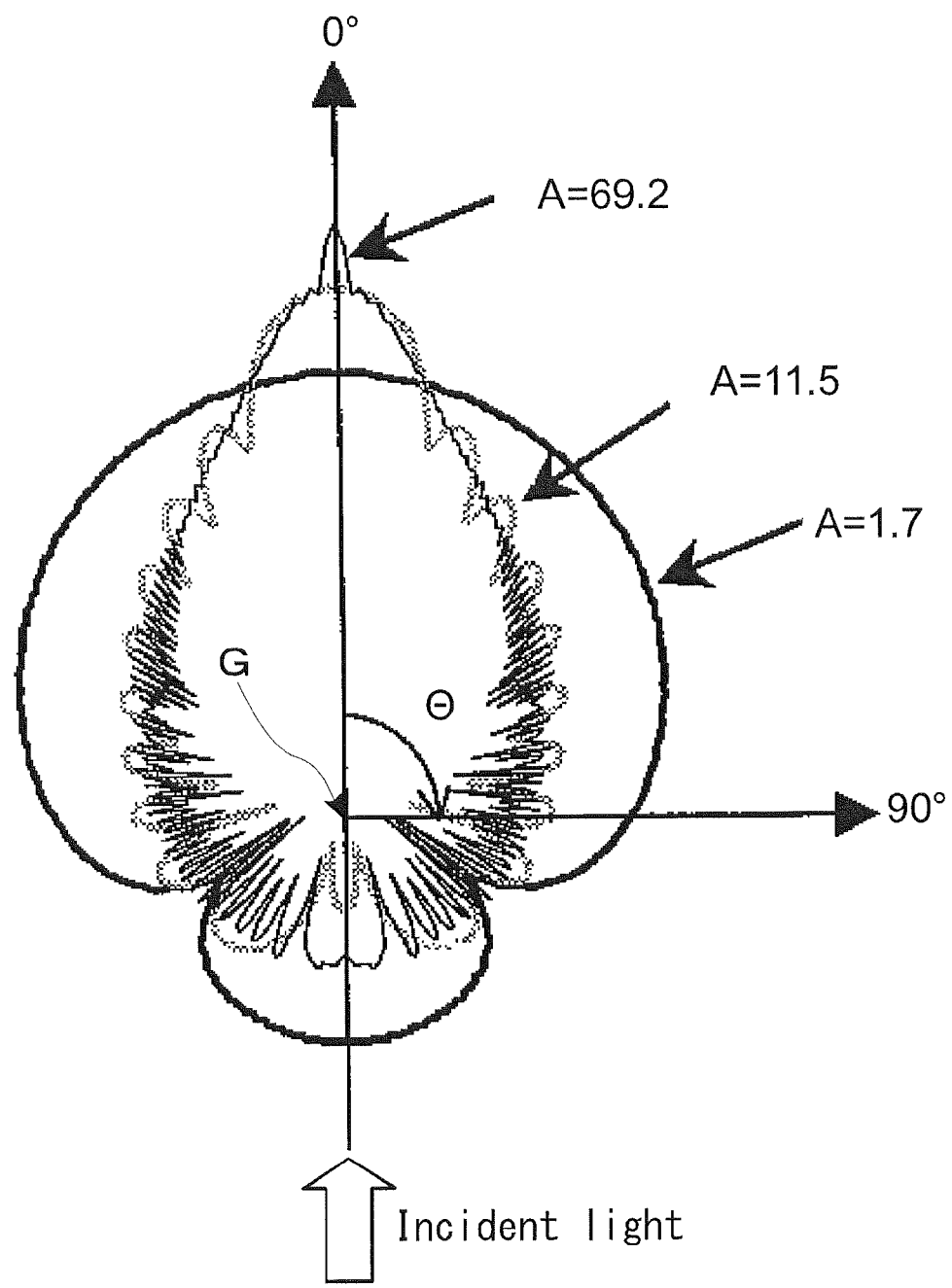
FIG. 4 is a graph indicating angle distribution (A, Θ) of scattered light intensity by a single spherical particle.

FIG. 4 is a graph indicating the intensity distribution I (A, Θ) by a single true spherical particle based on the above-described equations (1) to (5). In FIG. 4, there is shown angle distributions I(A, Θ) of scattered light intensity in a case where the spherical particle as the light scattering particle presents on a position of an original point G and the incident light being incident from a lower side in FIG. 4. The distance from the original point G to each curved line shows the scattered light intensity in the corresponding scattering angle direction. One curved line shows a scattered light intensity of "A" being 1.7, another curved line shows a scattered light intensity of "A" being 11.5, and still another curved line shows a scattered light intensity of "A" being 69.2. These scattered light intensities are indicated by a logarithmic scale in FIG. 4. It should be noted that a portion seen as slight intensity difference in FIG. 4 actually is significantly large difference.

As shown in FIG. 4, as the size parameter A increases (as the particle diameter of the spherical particle increases at a certain wavelength λ), the light is scattered with higher directionality toward an upper side in FIG. 4 (forward in the radiation direction). Actually, the angle distribution I(A, Θ) of the scattered light intensity may be controlled, at a fixed incident light wavelength λ, by using the radius "r" of the scattering particle and the relative refractive index "m" of the light scattering particle to the matrix as parameters.

In the light guide member 5 comprising N single true spherical particles, light is scattered by the spherical particles. The scattered light propagates in the light scattering guide member further and is scattered again by other spherical particles. If the particles are added at volume concentration not smaller than a certain degree, after such scattering is sequentially taken a plurality of times the light is emitted from the light scattering light guide member. Such phenomenon that the scattered light is further scattered is referred to as a multiple scattering phenomenon. In such multiple scattering, analysis by a ray tracing method with a transparent polymer is not easy. However, it is possible to trace behavior of the light by a Monte Carlo method to analyze characteristics thereof. According to this, when the incident light is not polarized, a cumulative distribution function $F(\Theta)$ of the scattering angle is represented by the following equation (6).

$$F(\Theta) = \frac{\int_0^{\Theta} I(\Theta)\sin\Theta d\Theta}{\int_0^{\pi} I(\Theta)\sin\Theta d\Theta} \quad (6)$$

Herein, a term $I(\Theta)$ in the equation (6) represents the scattering intensity of the spherical particle with the size parameter "A" represented by the equation (1). When the light of which intensity is $I_0$ enters the light guide member 5 and passes through a distance "y", and thereafter the intensity of the light is attenuated to "I" by the scattering, the relationship is represented by the following equation (7).

$$\frac{I}{I_0} = \exp(-\tau y) \quad (7)$$

The term $\tau$ in the equation (7) is referred to as turbidity, which corresponds to a scattering coefficient of the matrix, and is proportional to the number of particles N as in a following equation (8). The term $\sigma^S$ in the equation (8) represents a scattering cross-section.

$$\tau = \sigma_S N \quad (8)$$

From the equation (7), probability Pt(L) of light passing through the light guide member 5 of which length is L without scattering is represented by a following equation (9).

$$p_t(L) = \frac{I}{I_0} = \exp(-\sigma^s NL) \quad (9)$$

On the other hand, probability Ps(L) of light scattered before passing through a light path length L is represented by a following equation (10).

$$P_S(L) = 1 - P_t(L) = 1 - \exp(-\sigma_S NL) \quad (10)$$

As is understood from these equations, it is possible to control a degree of the multiple scattering in the light scattering light guide member by changing the turbidity "$\tau$."

By the above-described relational expressions, it is possible to control the multiple scattering in the light guide member 5 with using at least one of the size parameter "A" of the light scattering particle and the turbidity "$\tau$" as a parameter or parameters.

The light scattering particles contained in the light guide member 5 may be translucent silicone particles of which mean particle diameter is 2.4 µm, for example. The turbidity $\tau$, which is a scattering parameter corresponding to the scattering coefficient by the light scattering particles, may be set as $\tau = 0.49$ ($\lambda = 550$ nm).

By configuring the light guiding body 1 in the above described manner, it is possible to widen the light distribution angle while inhibiting loss of a light amount in the light guiding body 1 of the light emitted from the LED 3, thereby making light distribution characteristics of the light emitting device 2 similar to the light distribution characteristics of an incandescent lamp. Further, it is possible to decrease luminance unevenness of the light emitted from the light guiding body 1. It is considered that the above-described effect is obtained by the following mechanism.

Figure 5:
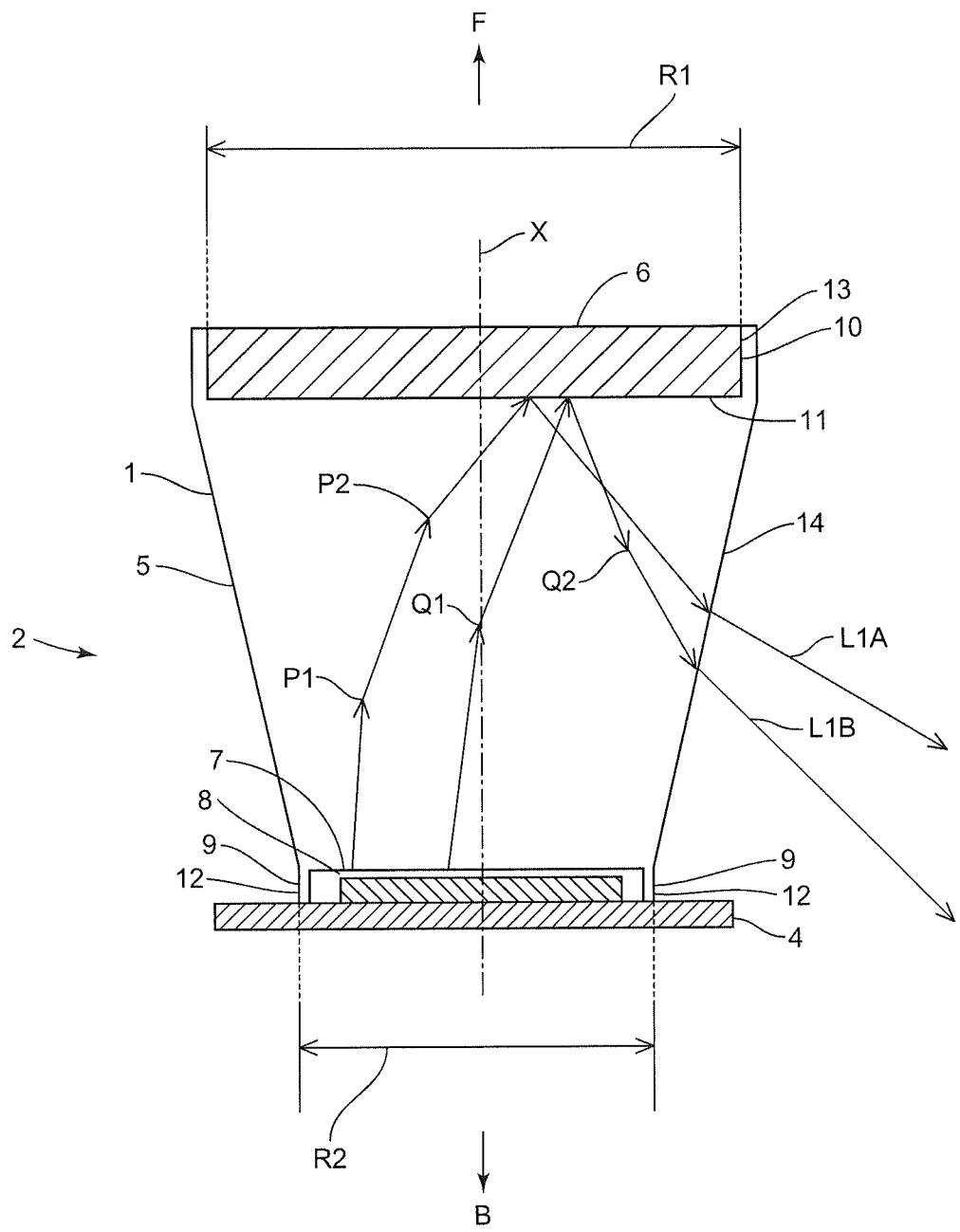
FIG. 5 is a view showing an example of light paths passing through the light guiding body.

First, it is considered that, since the light reflecting surface 11 is provided, the amount of the light emitted backward from the light guiding body 1 out of the light emitted from the LED 3 may be increased. That is to say, as shown in FIG. 5, a part of the light emitted from the LED 3 to enter the light guide member 5 is reflected further backward than the direction orthogonal to the light axis X by the light reflecting surface 11 as the rays L1A and L1B. According to this, it is considered that it is possible to widen the light distribution angle of the light emitted from the light guide member 5 to the back side by including the light reflecting surface 11 as compared to a case where the light reflecting surface 11 is not provided on the front end surface of the light guide member 5. Meanwhile, although a light path of the ray L1A is refracted at P1 and P2 and that of the ray L1B is refracted at Q1 and Q2, this indicates a state in which the rays L1A and L1B are scattered by the light scattering particles.

The light guide member 5 has the circular truncated cone-shape in which a diameter of a surface orthogonal to the light axis X gradually increases from the light incident surface 7 toward the light reflecting surface 11. Therefore, a side surface 14 as a light emitting surface of the light guide member 5 is inclined in a direction in which an incident angle of the light reflected by the light reflecting surface 11 to be incident on the side surface 14 decreases as compared to a case where the side surface 14 is parallel to the light axis X. According to this, it is considered that the light reflected by the light reflecting surface 11 to be incident on the side surface 14 is fully reflected by the side surface 14 and a ratio of the light returned into the light guide member 5 decreases, so that this may be efficiently emitted out of the light guide member 5.

Figure 6:
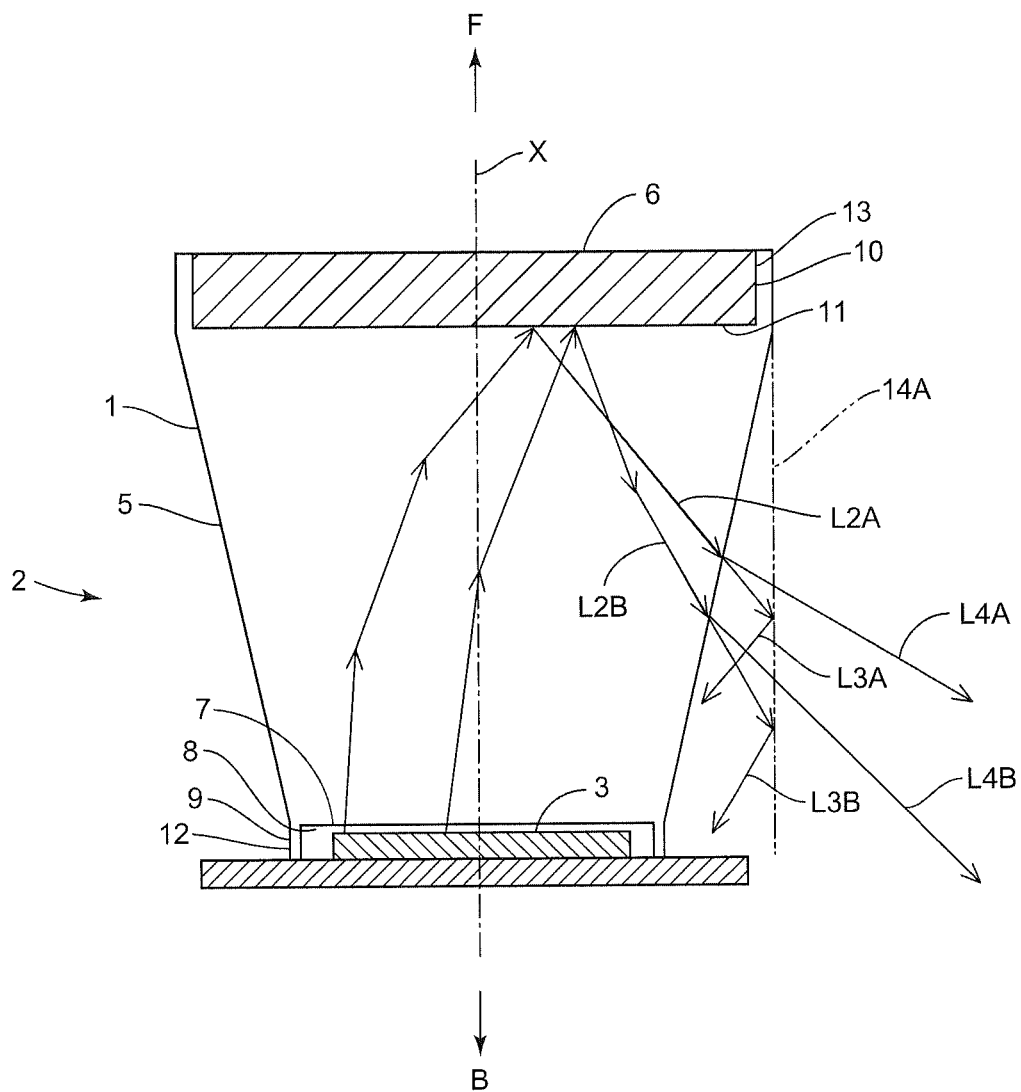
FIG. 6 is a view for explaining the light paths passing through the light guiding body.

That is to say, even though rays L2A and L2B incident on a side surface 14A at a total reflection angle are reflected into the light guide member 5 as rays L3A and L3B when the side surface 14, which is the light emitting surface, is parallel to the light axis X as the side surface 14A virtually shown in FIG. 6, it is possible to emit them out of the light guide member 5 as rays L4A and L4B by configuring such that the incident angles of the rays L2A and L2B decrease as with the side surface 14. According to this, it is considered that the light reflected by the light reflecting surface 11 may be efficiently emitted out of the light guide member 5.

As shown in FIG. 5, it is considered that the light distribution angle of the light emitted from the light guiding body 1 may be increased toward the back side because the diameter R1 of the light reflecting surface 11 is larger than the diameter R2 of the back end edge 12 of the light guide member 5 and a periphery of the light reflecting surface 11 juts laterally from the back end edge 12. That is to say, it is considered that a ratio of blocking of the light reflected backward by the light reflecting surface 11 by the light guide member 5 decreases as compared to a case where the diameter R1 is not larger than the diameter R2 by setting the diameter R1 of the light reflecting surface 11 larger than the diameter R2 of the back end edge 12 of the light guide member 5.

Figure 7:
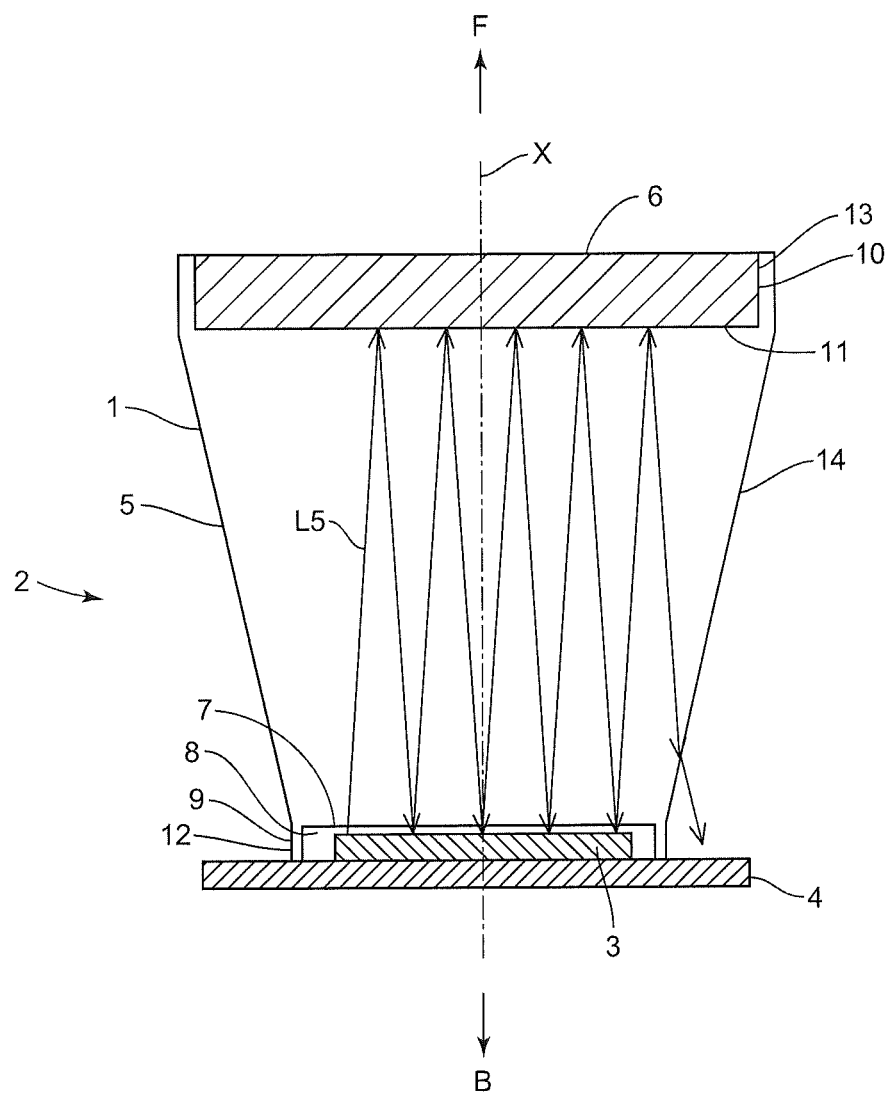
FIG. 7 is a view for showing light paths passing through a light guide member in a case of the light guide member being colorless and transparent.

Since the light scattering particles are contained in the light guide member 5, it is considered that the light entering the light guide member 5 from the LED 3 may be emitted out of the light guide member 5 with the smaller number of times of reflections in the light guide member 5. By decreasing the number of times of reflections, it is possible to inhibit the loss of the light amount by the reflection. For example, if the light scattering particles are not contained in the light guide member 5, for example, a ray L5 entering the light guide member 5 from the LED 3 is sometimes repeatedly reflected between the light reflecting surface 11 and the LED 3 to be emitted out of the light guide member 5 as shown in FIG. 7. Therefore, the light amount is lost by each reflection.

Figure 8:
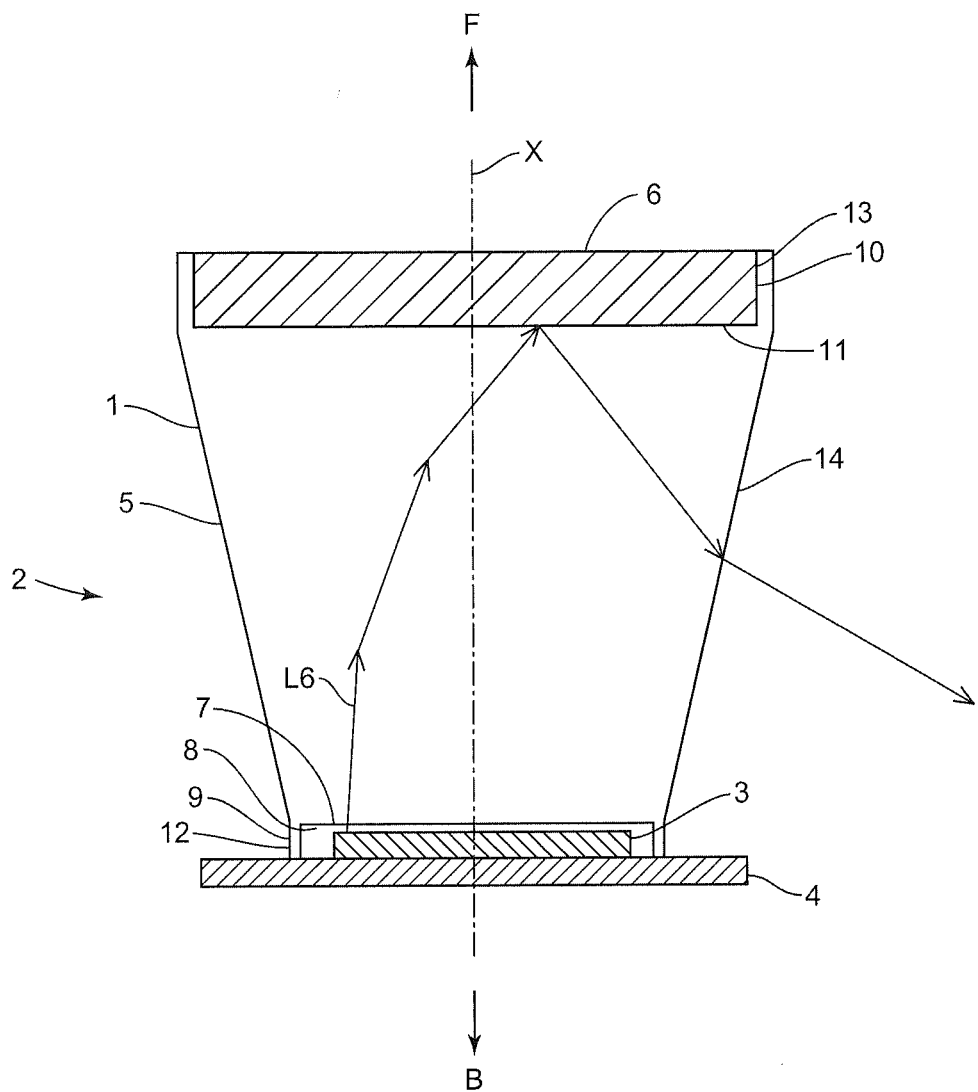
FIG. 8 is a view for explaining a light path passing through the light guiding body.

On the other hand, by making the light guide member 5 contain the light scattering particles, it is possible to generate rays scattered in a direction in which the incident angle on the light reflecting surface 11 increases by the light scattering particles as a ray L6 shown in FIG. 8, for example. Since the incident angle of a ray incident on the light reflecting surface 11 increases, it is considered that the number of times of reflections between the light reflecting surface 11 and the LED 3 repeated until the light incident on the light incident surface 7 from the LED 3 is emitted out of the light guide member 5 may be decreased. In this manner, by decreasing the number of times of reflections repeated between the light reflecting surface 11 and the LED 3, it is possible to decrease the loss of the light amount by the reflection. That is to say, emission efficiency, which is a ratio of the light amount emitted from the light guiding body 1 to that emitted from the LED 3, may be increased.

The light entering the light guide member 5 from the LED 3 is scattered by the light scattering particle, so that the luminance unevenness of the light emitted from the light guide member 5 is decreased. FIGS. 9 to 19 show graphs indicating comparison of the light distribution angle and luminance distribution between a case where the light guide member 5 formed of the colorless and transparent PMMA resin contains the spherical light scattering particles of which diameter is 2.4 μm and a case where the light guide member 5 does not contain the particles. In each graph, a radial direction indicates the luminance. The direction at the light distribution angle of 0 degree corresponds to the front side of the light emitting device 2 and the direction at the light distribution angle of 180 degrees corresponds to the back side. The luminance of each light distribution angle is shown by a mean value within a range of ±2 degrees is indicated.

Figure 9:
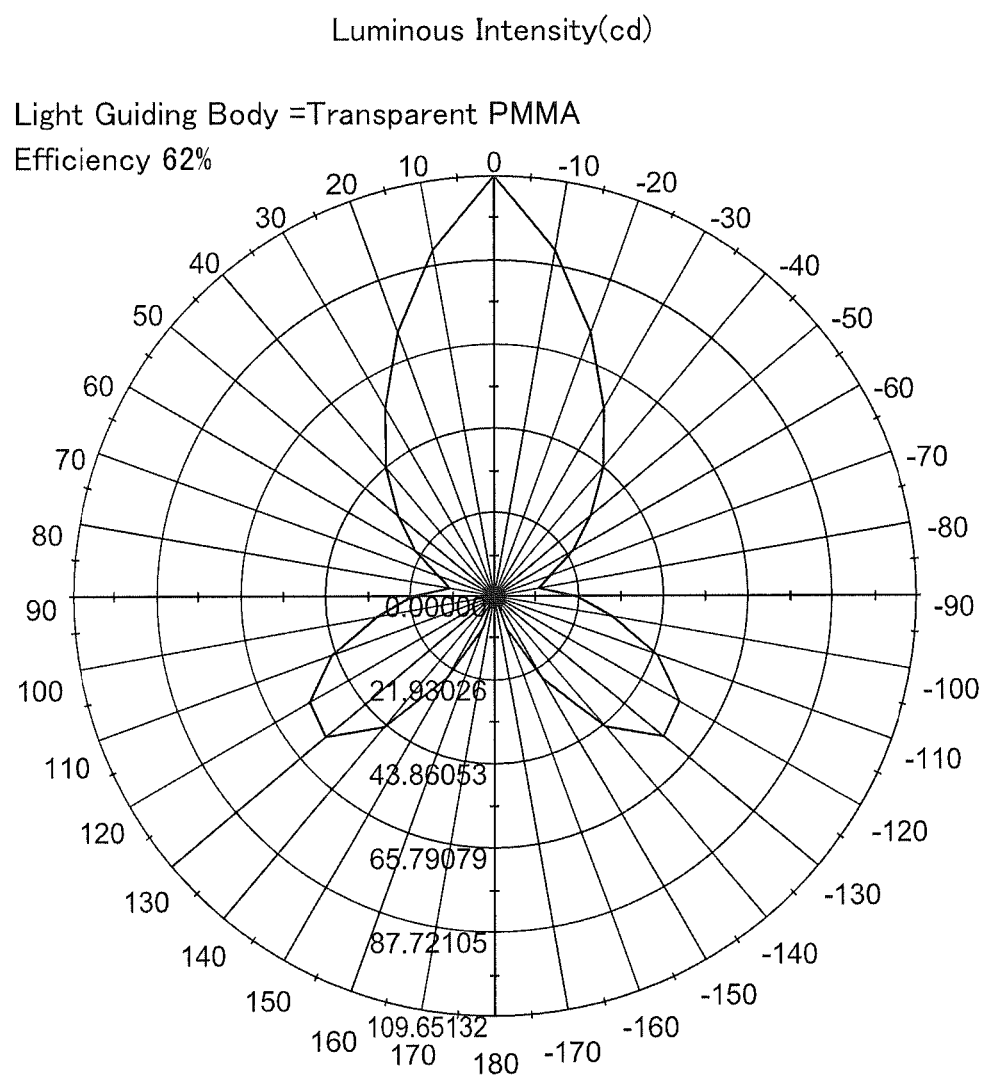
FIG. 9 is a view showing a light distribution angle and luminance distribution of the light guide member.

FIG. 9 shows a light distribution angle and luminance distribution in a case where the light guide member 5 does not contain the light scattering particles and where the light guide member 5 is colorless and transparent. In this case, the emission efficiency is 62%.

Figure 10:
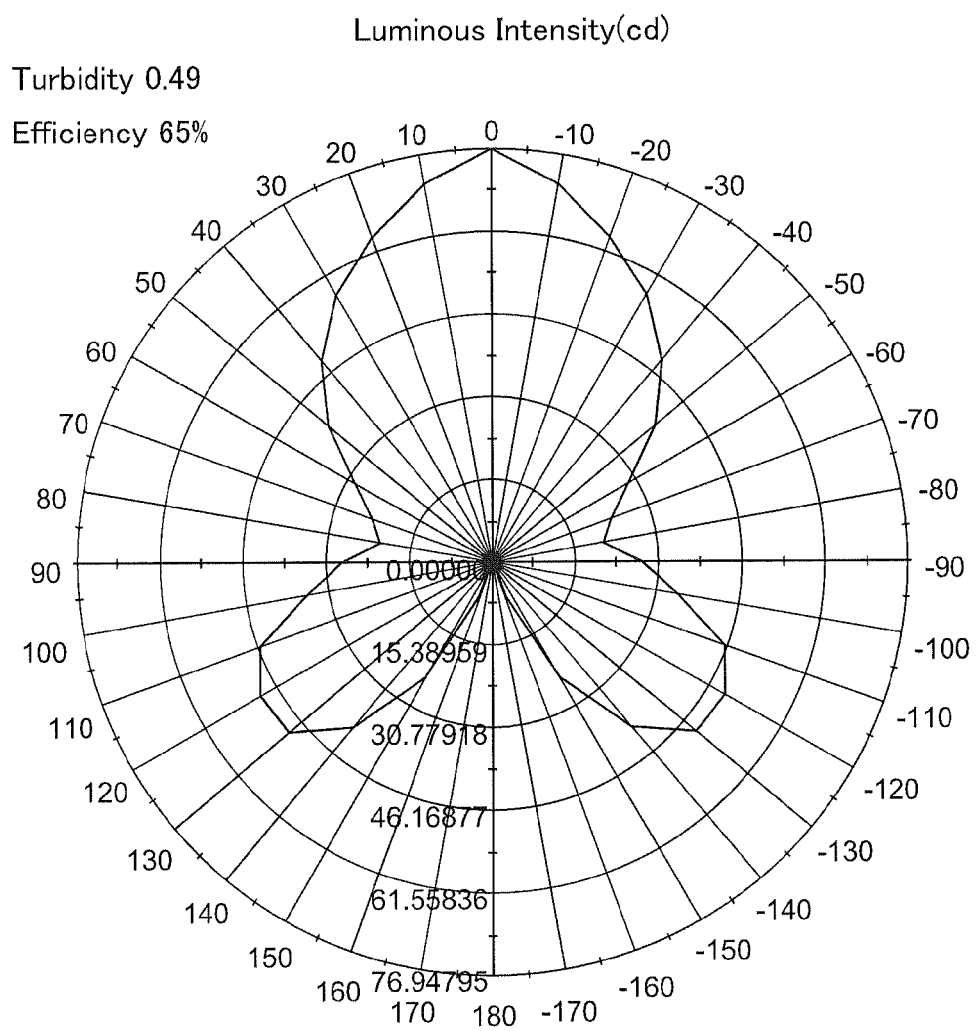
FIG. 10 is a view showing a light distribution angle and luminance distribution of the light guide member in a case where the light guide member is made from a light scattering guide material of which turbidity is 0.49 (λ=550 nm)

FIG. 10 shows a light distribution angle and luminance distribution in a case where the light guide member 5 is made from a light scattering guide material of which turbidity is 0.49 ($\lambda$=550 nm). In this case, the emission efficiency is 65%.

Figure 11:
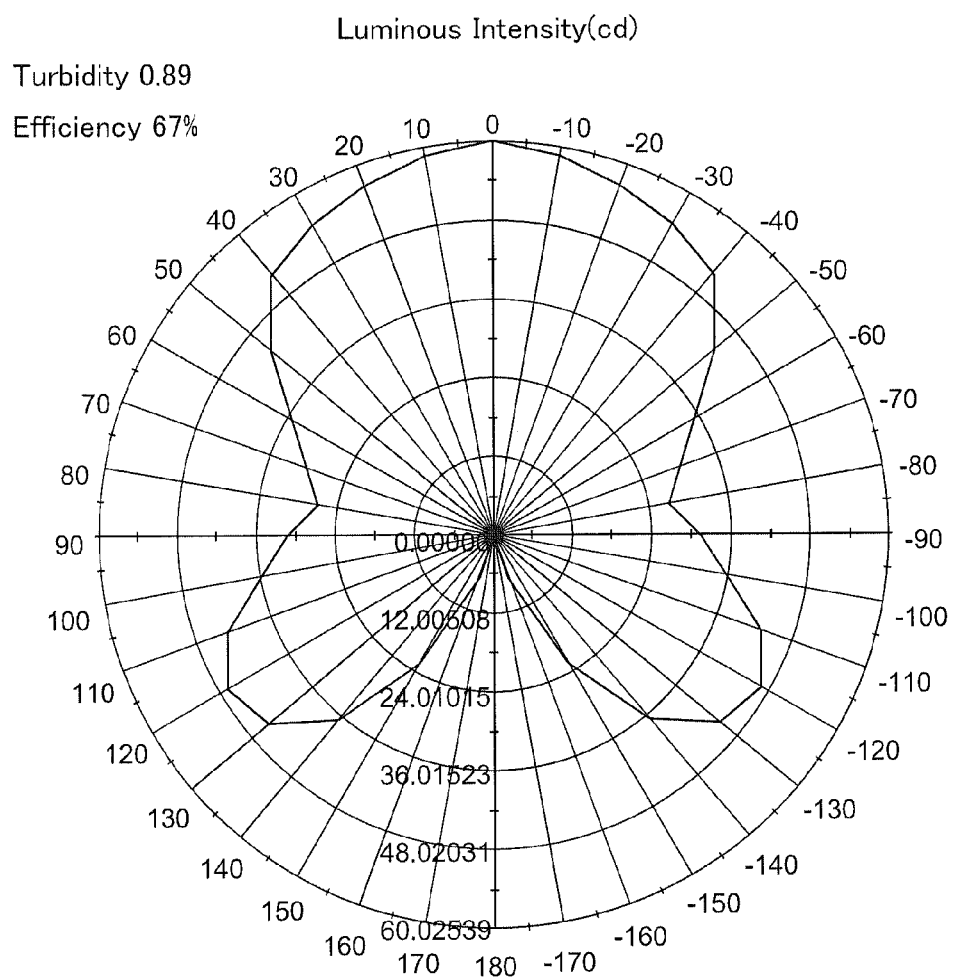
FIG. 11 is a view showing a light distribution angle and luminance distribution of the light guide member in a case where the light guide member is made form a light scattering guide material of which turbidity is 0.98 (λ=550 nm)

FIG. 11 shows a light distribution angle and luminance distribution in a case where the light guide member 5 is made from a light scattering guide material of which turbidity is 0.98 ($\lambda$=550 nm). In this case, the emission efficiency is 67%.

Figure 12:
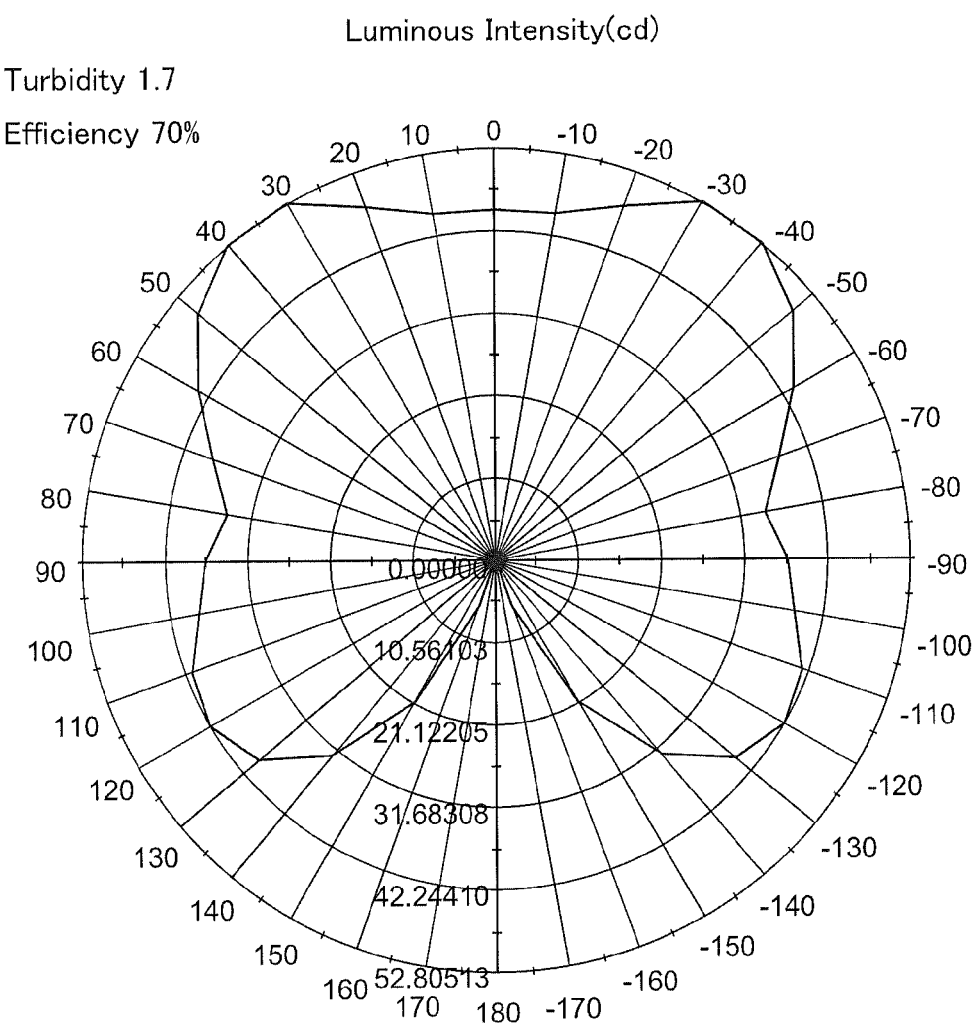
FIG. 12 is a view showing a light distribution angle and luminance distribution of the light guide member in a case where the light guide member is made from a light scattering guide material of which turbidity is 1.7 (λ=550 nm)

FIG. 12 shows a light distribution angle and luminance distribution in a case where the light guide member 5 is made from a light scattering guide material of which turbidity is 1.7 ($\lambda$=550 nm). In this case, the emission efficiency is 70%.

Figure 13:
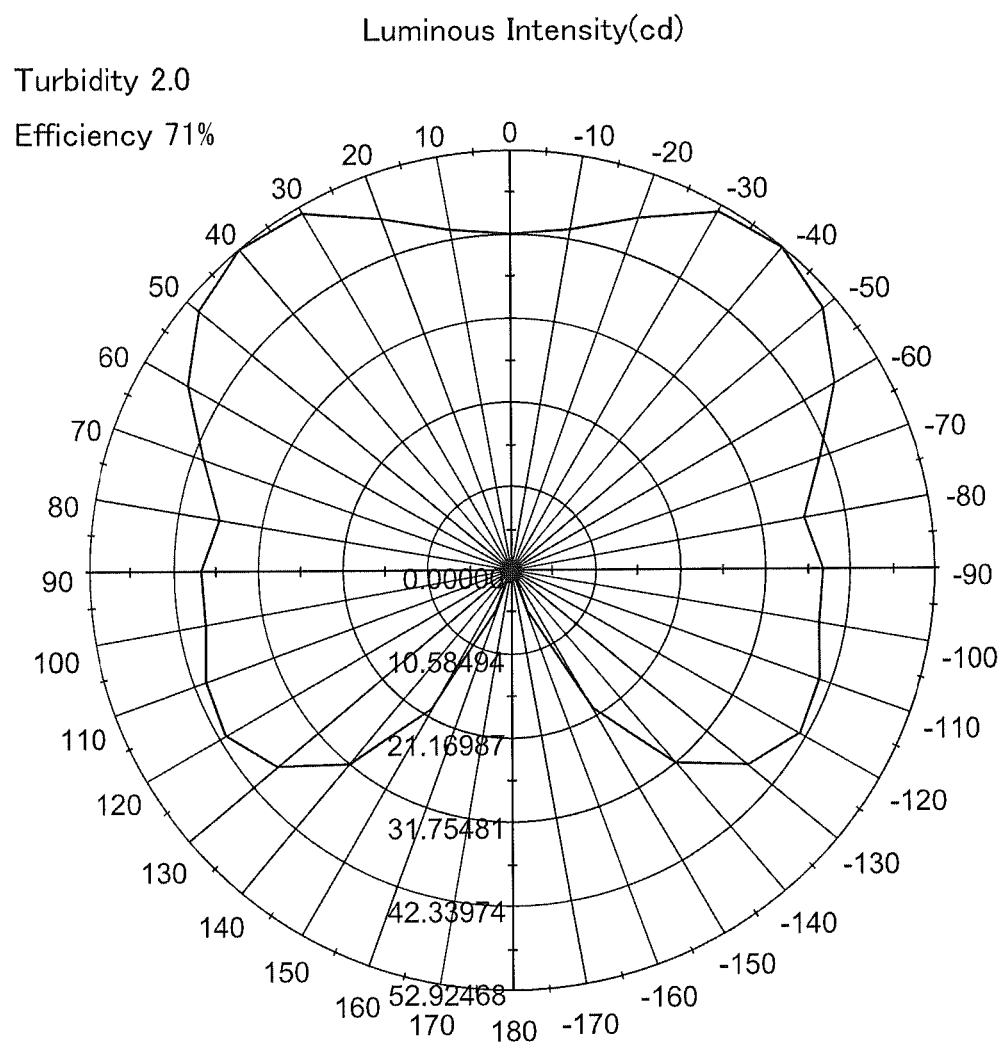
FIG. 13 is a view showing a light distribution angle and luminance distribution of the light guide member in a case where the light guide member is made from a light scattering guide material of which turbidity is 2.0 (λ=550 nm)

FIG. 13 shows a light distribution angle and luminance distribution in a case where the light guide member 5 is made from a light scattering guide material which turbidity is 2.0 ($\lambda$=550 nm). In this case, the emission efficiency is 71%.

Figure 14:
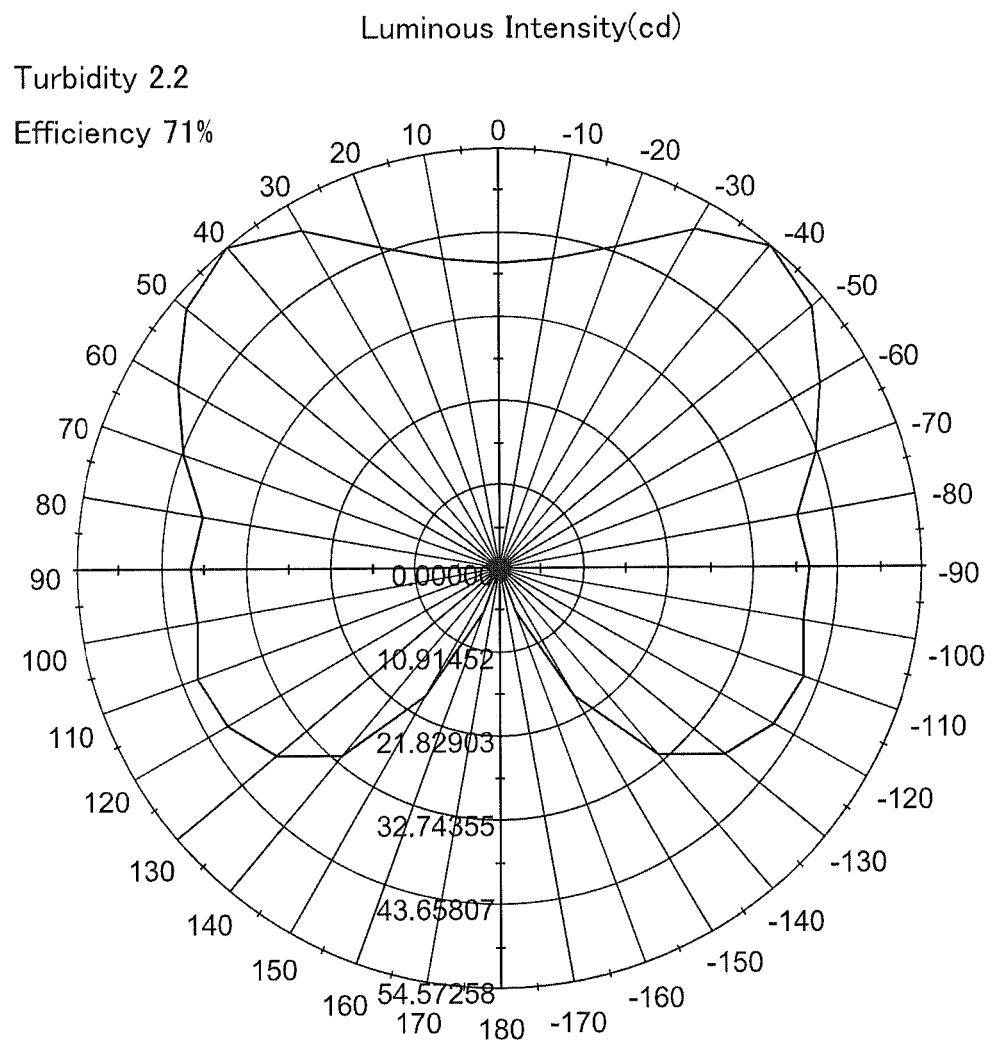
FIG. 14 is a view showing a light distribution angle and luminance distribution of the light guide member in a case where the light guide member is made from a light scattering guide material of which turbidity is 2.2 (λ=550 nm)

FIG. 14 shows the light distribution angle and the luminance distribution in a case where the light guide member 5 is made from a light scattering guide material of which turbidity is 2.2 ($\lambda$=550 nm). In this case, the emission efficiency is 71%.

Figure 15:
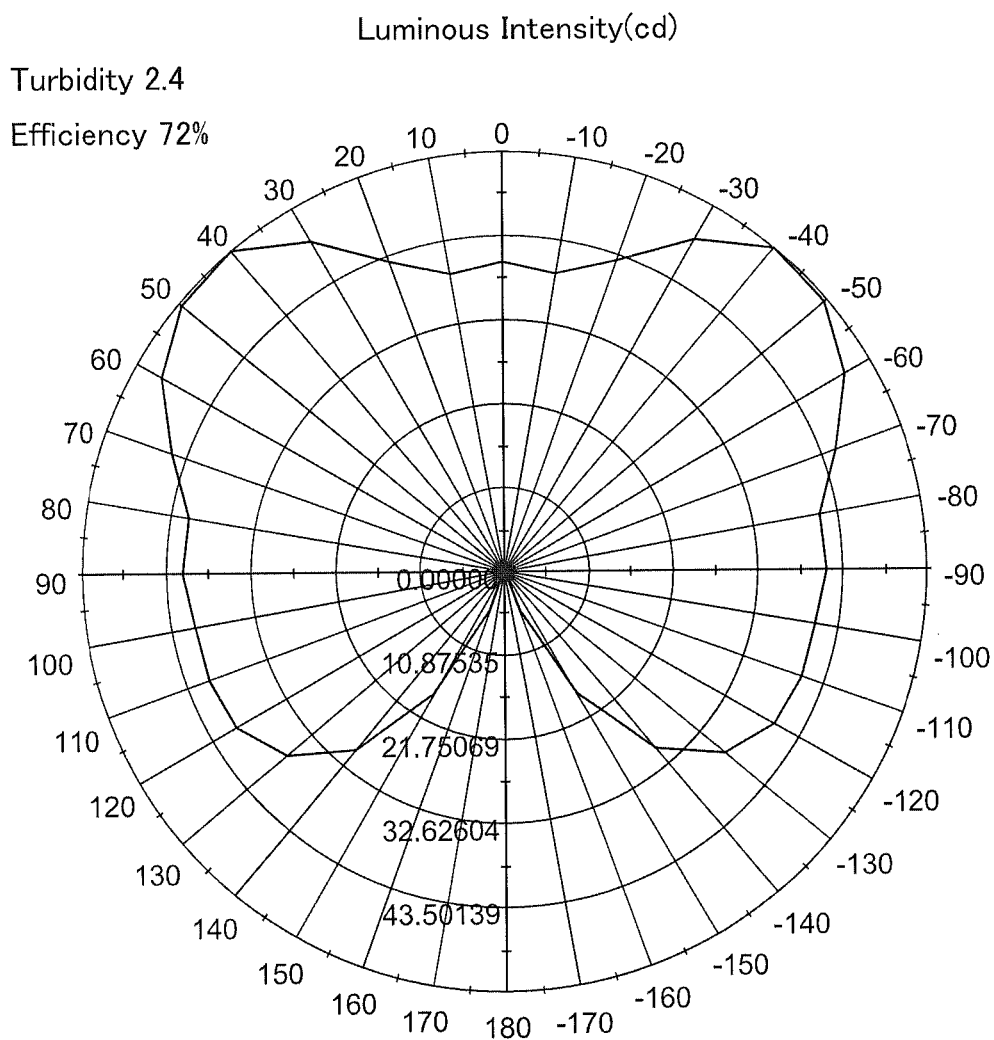
FIG. 15 is a view showing a light distribution angle and luminance distribution of the light guide member in a case where the light guide member is made from a light scattering guide material of which turbidity is 2.4 (λ=550 nm)

FIG. 15 shows a light distribution angle and luminance distribution in a case where the light guide member 5 is made from a light scattering guide material of which turbidity is 2.4 ($\lambda$=550 nm). In this case, the emission efficiency is 72%.

Figure 16:
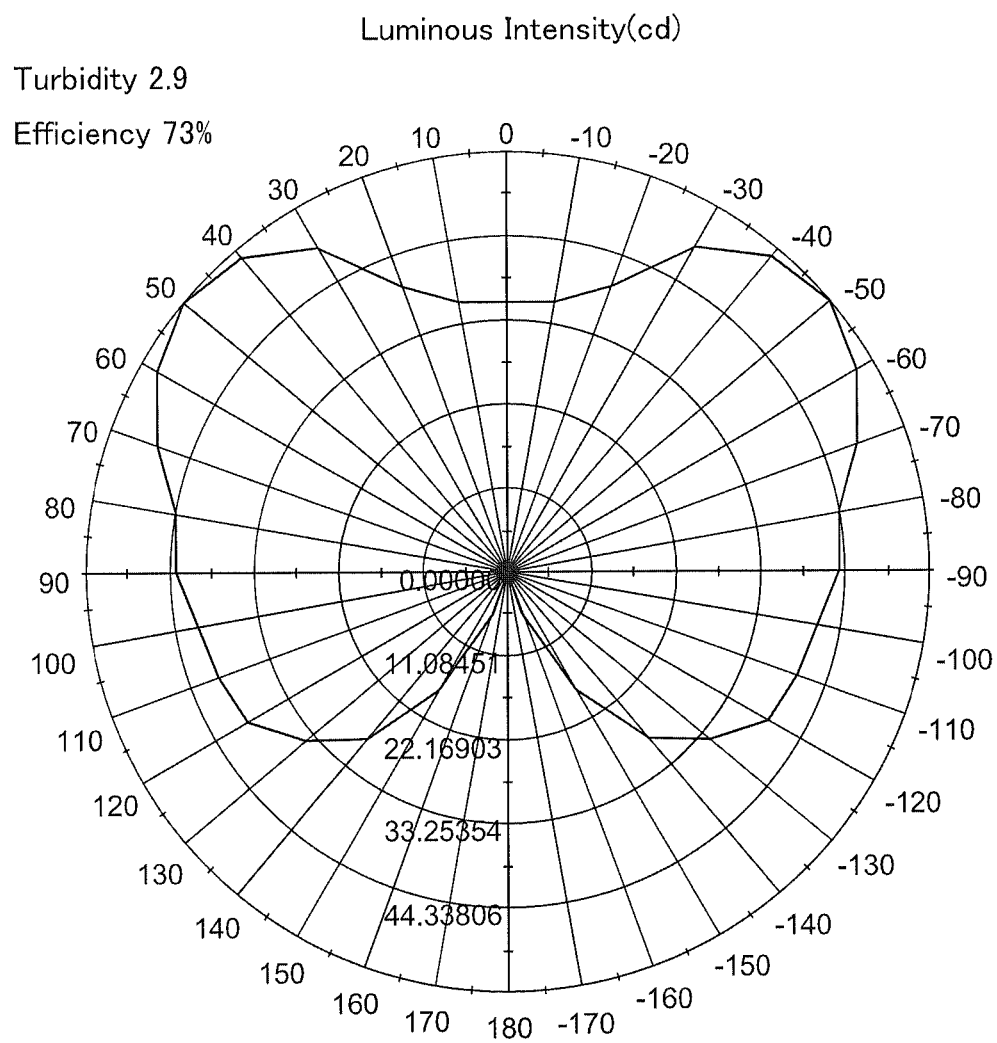
FIG. 16 is a view showing a light distribution angle and luminance distribution of the light guide member in a case where the light guide member is made from a light scattering guide material of which turbidity is 2.9 (λ=550 nm)

FIG. 16 shows a light distribution angle and luminance distribution in a case where the light guide member 5 is made from a light scattering guide material of which turbidity is 2.9 ($\lambda$=550 nm). In this case, the emission efficiency is 73%.

Figure 17:
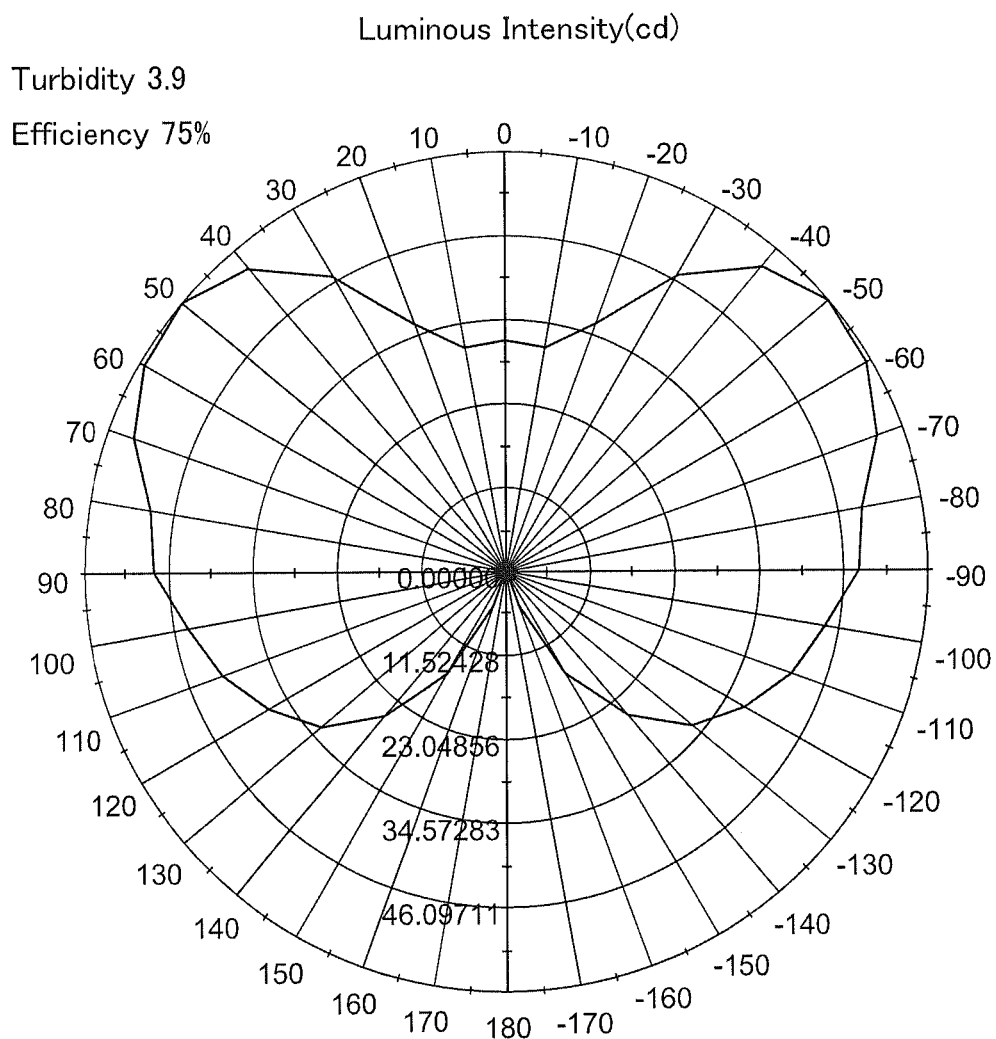
FIG. 17 is a view showing a light distribution angle and luminance distribution of the light guide member in a case where the light guide member is made from a light scattering guide material of which turbidity is 3.9 (λ=550 nm)

FIG. 17 shows a light distribution angle and luminance distribution in a case where the light guide member 5 is made from a light scattering guide material of which turbidity is 3.9 ($\lambda$=550 nm). In this case, the emission efficiency is 75%.

Figure 18:
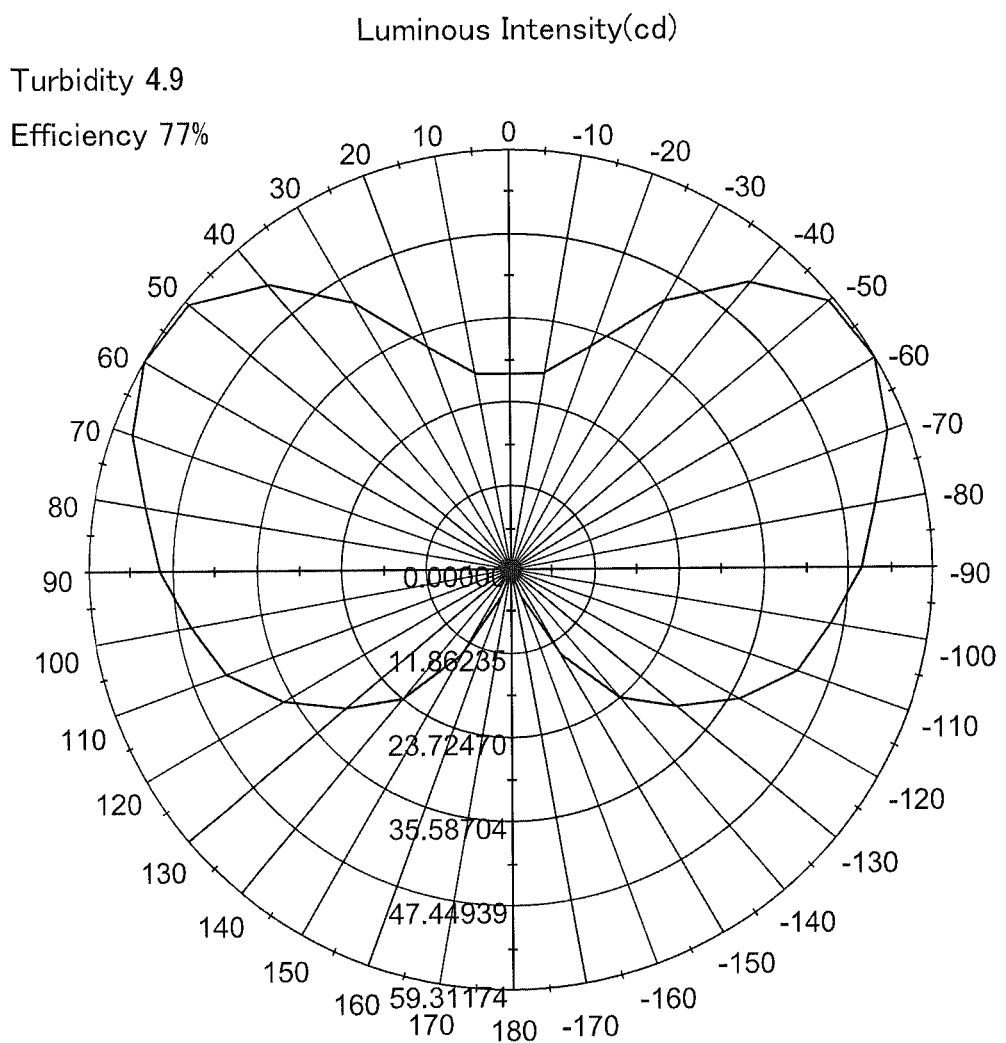
FIG. 18 is a view showing a light distribution angle and luminance distribution of the light guide member in a case where the light guide member is made from a light scattering guide material of which turbidity is 4.9 (λ=550 nm)

FIG. 18 shows a light distribution angle and luminance distribution in a case where the light guide member 5 is made from a light scattering guide material of which turbidity is 4.9 ($\lambda$=550 nm). In this case, the emission efficiency is 77%.

Figure 19:
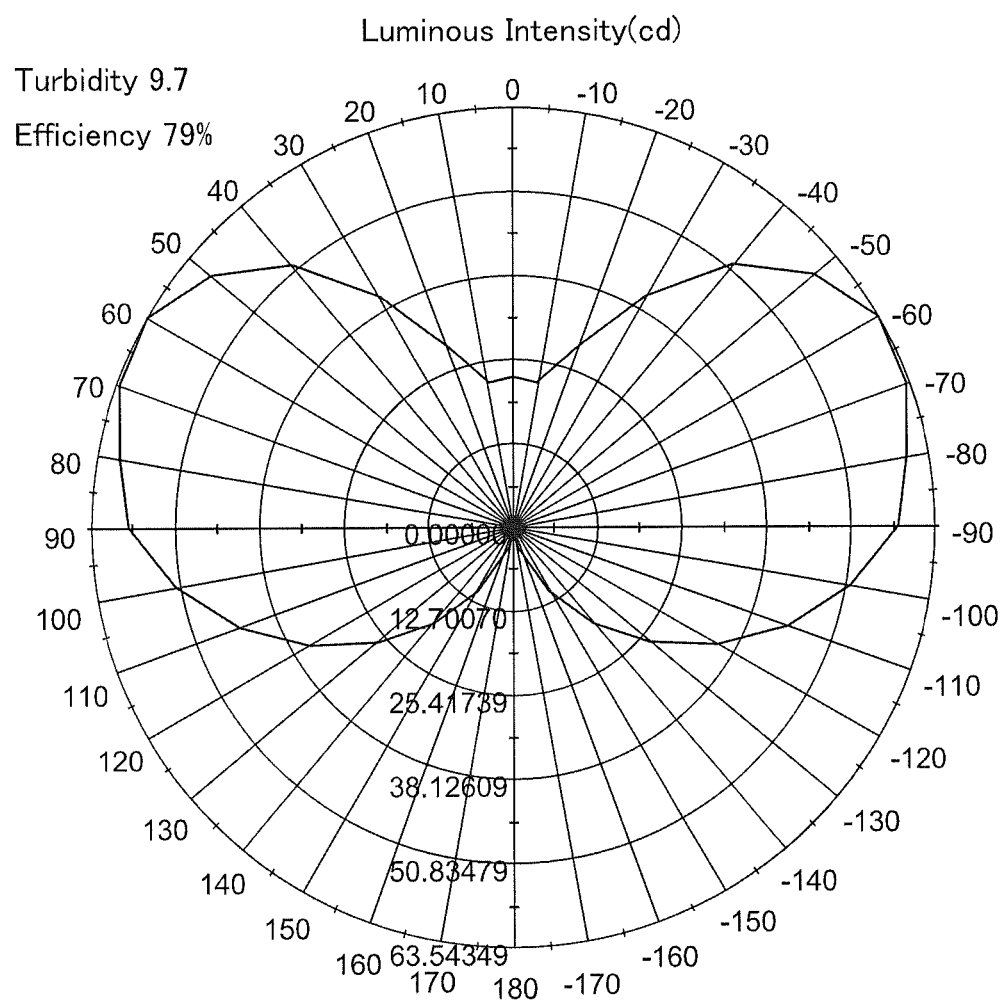
FIG. 19 is a view showing a light distribution angle and luminance distribution of the light guide member in a case where the light guide member is made from a light scattering guide material of which turbidity is 9.7 (λ=550 nm)

FIG. 19 shows a light distribution angle and luminance distribution in a case where the light guide member 5 is made from a light scattering guide material body of which turbidity is 9.7 ($\lambda$=550 nm). In this case, the emission efficiency is 79%.

As shown in FIGS. 9 to 19, there is a tendency that, the higher the value of the turbidity $\tau$ of the light guide member 5 is, the larger the emission efficiency is. By using a light scattering guide material having turbidity within a range of $0.3<\tau<6.5$, it is possible to increase the light distribution angle and decrease the luminance unevenness, and especially by using a material having turbidity within a range of $0.69<\tau<5.1$, the light distribution angle and the luminance unevenness of the light emitted from the light guiding body 1 are more similar to these of an electric lamp. By using a material having turbidity within the range of $1.2<\tau<3.2$, it is possible to decrease the luminance unevenness while increasing the light distribution angle of the light emitted from the light guiding body 1 as shown in FIGS. 12 to 16.

Figure 20A:
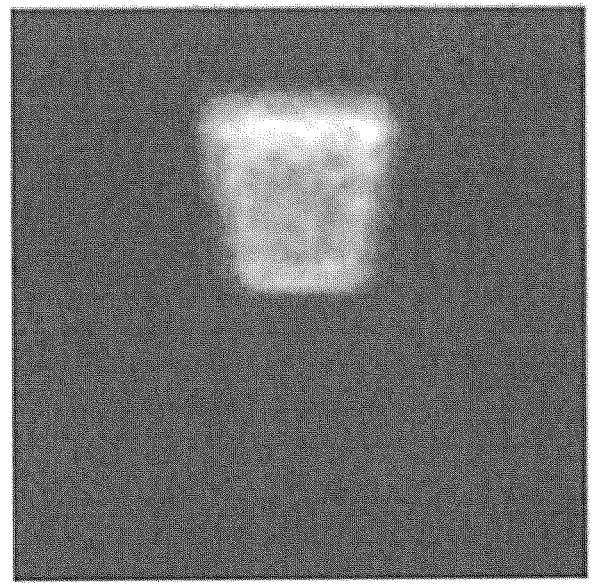
FIG. 20A is a view showing a light emitting state of the light guiding body in a case where the light guide member is made from a light scattering guide material of which turbidity is 0.98 (λ=550 nm)
Figure 20B:
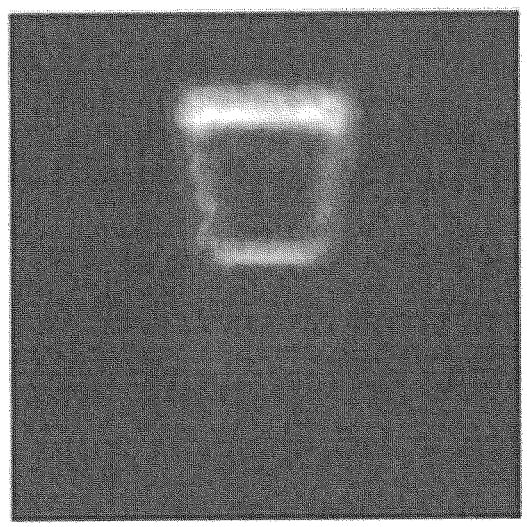
FIG. 20B is a view showing a light emitting state of the light guiding body in a case where the light guide member contains no light scattering particle.

FIG. 20A is a view showing a light emitting state of the light guiding body 1 in which the turbidity of the light scattering guide material is turbidity of 0.98 ($\lambda$=550 nm), that is to say, the light guiding body 1 comprises the light guide member 5 with the luminance distribution shown in FIG. 11. FIG. 20B is a view showing the light emitting state of the light guiding body 1 in which the light guide member 5 does not include the light scattering particle, that is to say, the light guiding body 1 comprises the light guide member 5 with the luminance distribution shown in FIG. 9. In each drawing, a white portion indicates emitted light, and the larger the white portion is, the higher or brighter the luminance of the emitted light is. As shown in FIG. 20B, in the case where the light guide member 5 is colorless and transparent, it seems that a shining portion is concentrated on a front portion of the light guiding body 1. On the other hand, in the case where the light guide member 5 is made from a light scattering material, as shown in FIG. 20A, it seems that an entire light guiding body 1 uniformly shines as compared to a state shown in FIG. 20B. By making the light guide member 5 from a light scattering material in this manner, it is possible to make the light distribution characteristics of the light emitting device 2 similar to the light distribution characteristics of an incandescent lamp.

(Principal Effect of this Exemplary Embodiment)

As described above, the light guiding body 1 comprises the light incident surface 7 arranged on one end side of the light guide member 5, a light reflecting surface 11 arranged on another end side of the light guide member 5 opposite to the light incident surface 7 across the light guide member 5 and the side surface 14 as a light emitting surface, arranged on a side surface of the light guide member 5 between the light incident surface 7 and the light reflecting surface 11, through which light input from the light incident surface 7 into the light guide member 5 passes to outside, and the light guide member 5 is formed as a solid body and made from light scattering guide material which contains light scattering particles.

By configuring the light guiding body 1 in this manner, a part of the light entering from the light incident surface 7 is reflected further backward than the direction orthogonal to the light axis X by the light reflecting surface 11. Therefore, it is possible to widen the light distribution angle of the light emitted from the light guide member 5 to the back side by providing the light reflecting member 6 as compared to a case in which the light reflecting member 6 is not provided on the front end surface of the light guide member 5. Since the light guide member 5 contains light scattering particles, it is possible to increase the emission efficiency of the light emitted from the light guiding body 1 to that entering the light guiding body 1 from the LED 3. Since the light entering the light guide member 5 from the LED 3 is scattered by the light scattering particles, it is possible to decrease the luminance unevenness of the light emitted from the light guide member 5.

The side surface 14 as the light emitting surface of the light guiding body 1 is an inclined surface with an acute angle between the same and the surface including the light reflecting surface 11. That is to say, the side surface 14 inclines in the direction in which the incident angle of the light reflected by the light reflecting surface 11 to be incident on the side surface 14 increases. Therefore, the light reflected by the light reflecting surface 11 to be incident on the side surface 14 is fully reflected by the side surface 14 and the ratio of the light returning into the light guide member 5 decreases, so that the light may be efficiently emitted out of the light guide member 5. That is to say, it is possible to efficiently emit the light reflected by the light reflecting surface 11 out of the light guide member 5.

Since the light guide member 5 contains the light scattering particles entirely and the whole of the light guide member 5 is made from a light scattering guide material, it is possible to increase light emission efficiency of the light guiding body 1.

Meanwhile, by making the light guide member 5 from a light scattering guide material of which turbidity $\tau$ is not smaller than 0.3 and not larger than 6.5, it is possible to increase the light distribution angle and to decrease the luminance unevenness. By using a material of which turbidity $\tau$ is not smaller than 1.2 and not larger than 3.2, it is possible to decrease the luminance unevenness while increasing the light distribution angle of the light emitted from the light guiding body 1.

Figure 21A:
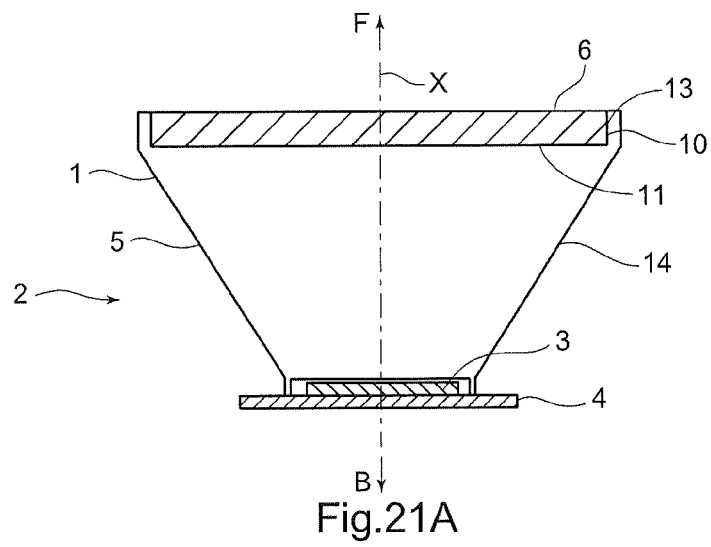
FIG. 21A, FIG. 21B and FIG. 21C are views showing modified embodiments.
Figure 21B:
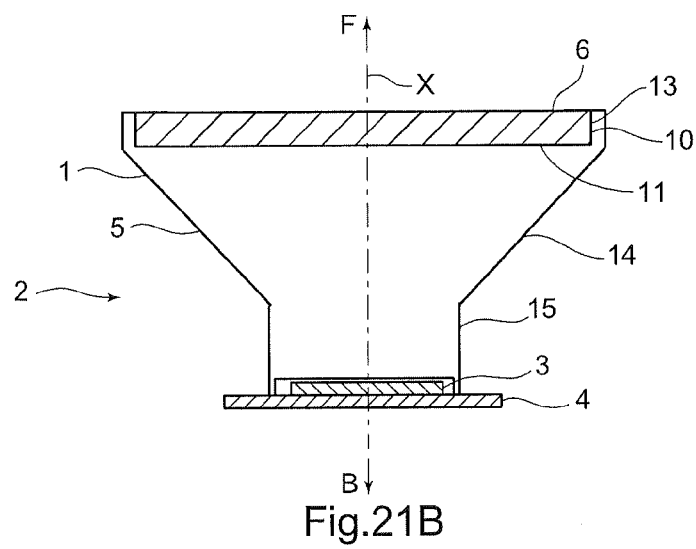
Figure 21C:
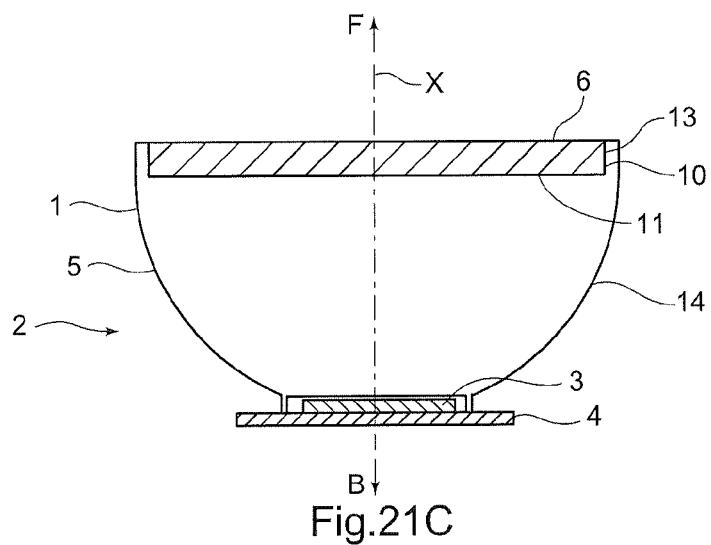

The shape of the light guide member 5 is not limited to the above-described shape and this may have shapes shown in FIG. 21A, FIG. 21B, and FIG. 21AC. That is to say, it is also possible to configure such that the inclination angle of the side surface 14 with respect to the light axis X is larger than the inclination angle of the side surface 14 of the light guide member 5 with respect to the light axis X shown in FIG. 10 and the like as shown in FIG. 21A. It is also possible to arrange a cylindrical portion 15 between the light incident surface 7 and the inclined surface of the side surface 14 as shown in FIG. 21B. It is also possible to configure to form the side surface 14 as the light emitting surface of a part of a spherical surface as shown in FIG. 21C. By configuring the light guiding body 1 as shown in FIGS. 21A, B, and C, it is possible to further increase a light distribution amount to the back side.

(Second Embodiment)

Figure 22:
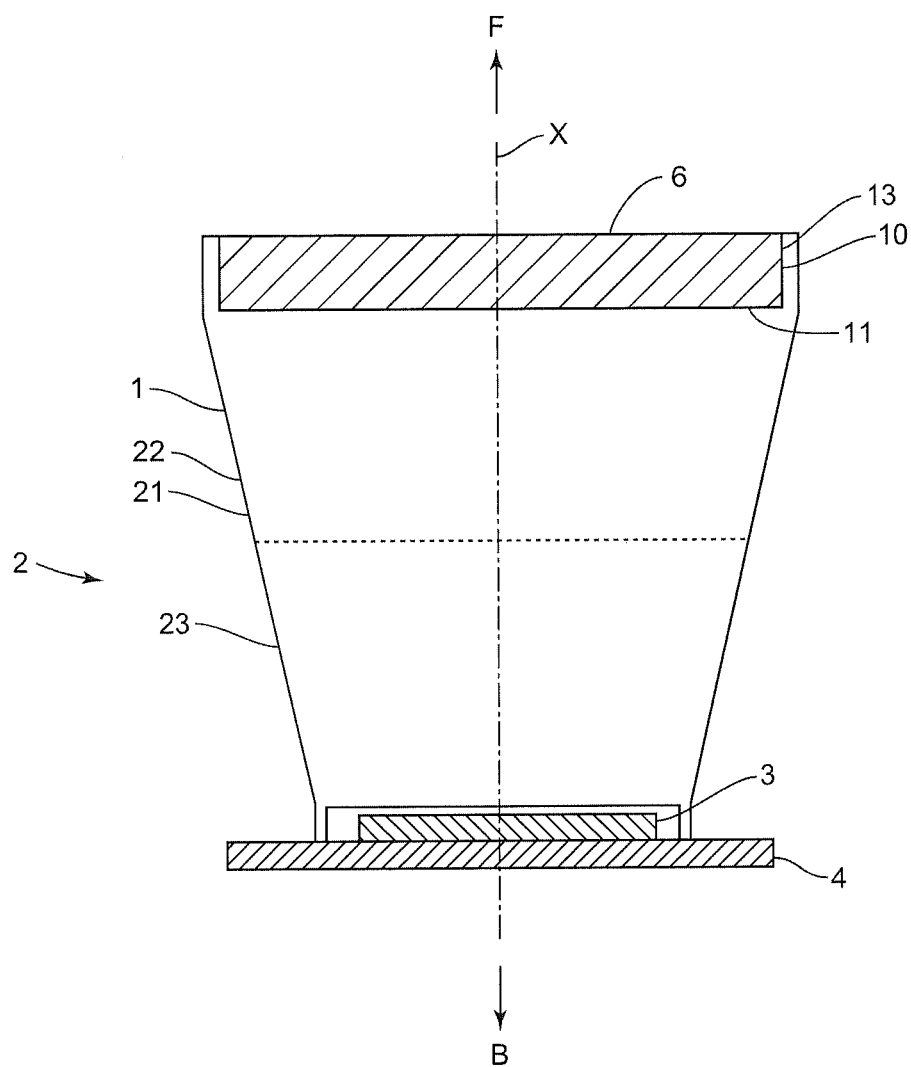
FIG. 22 is a view showing another embodiment.
Figure 23:
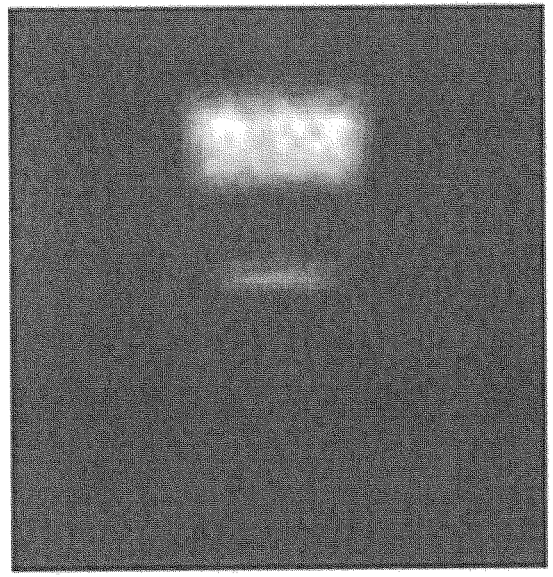
FIG. 23 is a view showing a light emitting state of the light guiding body shown in FIG. 22.
Figure 24:
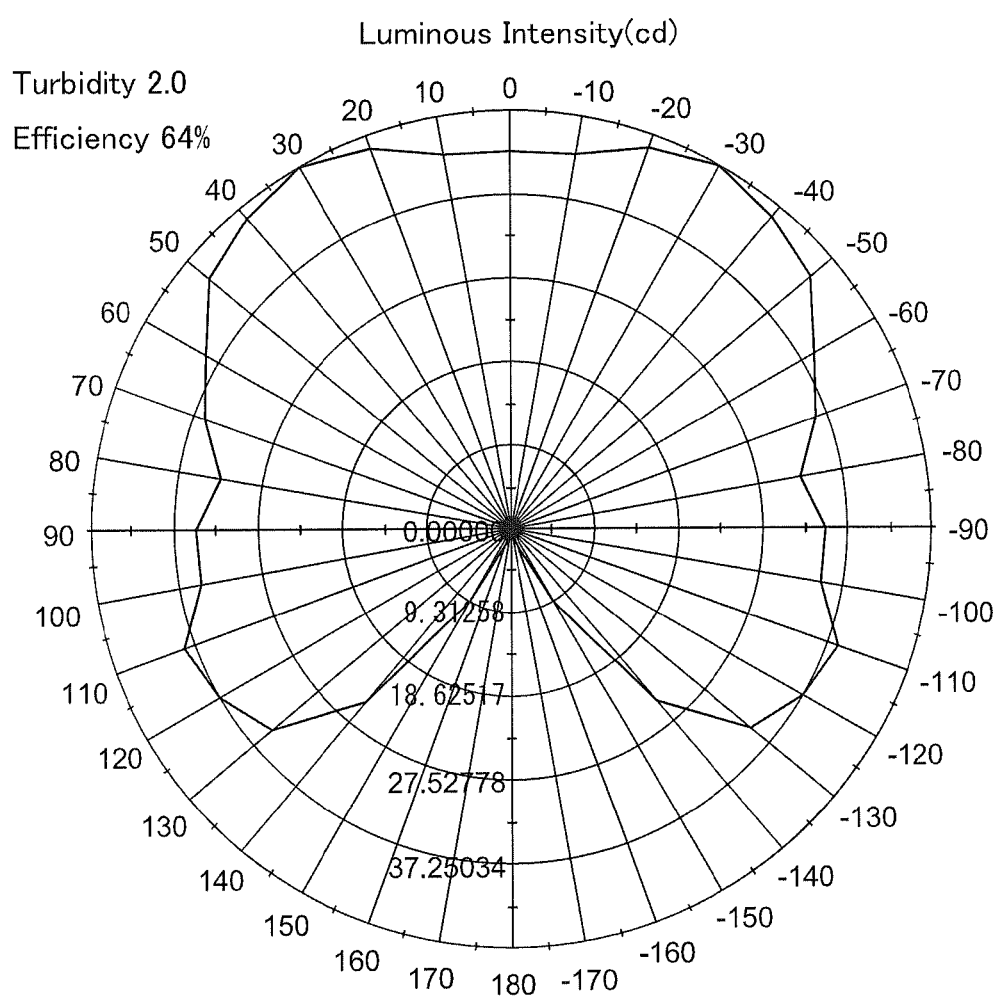
FIG. 24 is a view showing a light distribution angle and luminance distribution of the light guiding body shown in FIG. 22.

The light guide member of the light guiding body 1 can be configured as a light guide member 21 shown in FIG. 22. The light guide member 21 comprises a light scattering guide layer 22 made from a light scattering guide material and a transparent layer 23 formed as a transparent section, which does not contain the light scattering particles. The transparent layer 23 is arranged between the light scattering guide layer 22 and the light incident surface 7. In FIG. 22, the hatching of the cross-sectional portion of the light guide member 21 is not shown. By configuring the light guide member 21 in this manner, the light emitting state from the light guiding body 1 may be made more similar to that of the incandescent lamp in appearance as shown in FIG. 23. FIG. 23 is a view showing the light emitting state of the light guiding body 1 comprising the light guide member 21 in which the white portion indicates the emitted light. In the light emitting state shown in FIG. 23, the larger the white portion is, the higher the luminance of the emitted light is. By using the light guide member 21, it is possible to make the light emitting state in appearance as if the light source is arranged on a portion distant from a base as the incandescent lamp in which the light emitting section (filament) is arranged on a position distant from the base. FIG. 24 is a graph indicating a light distribution angle and luminance distribution of the light guide member 21 made from colorless and transparent PMMA containing light scattering particles of which diameter is 2.4 µm as a light scattering guide material of which turbidity is 2.0. The light guide member 21 may be manufactured by so-called two-color molding in which the transparent layer 23 is molded as a primary side and thereafter the light scattering guide layer 22 is integrally molded together with the transparent layer 23 as a secondary side, for example.

Figure 25:
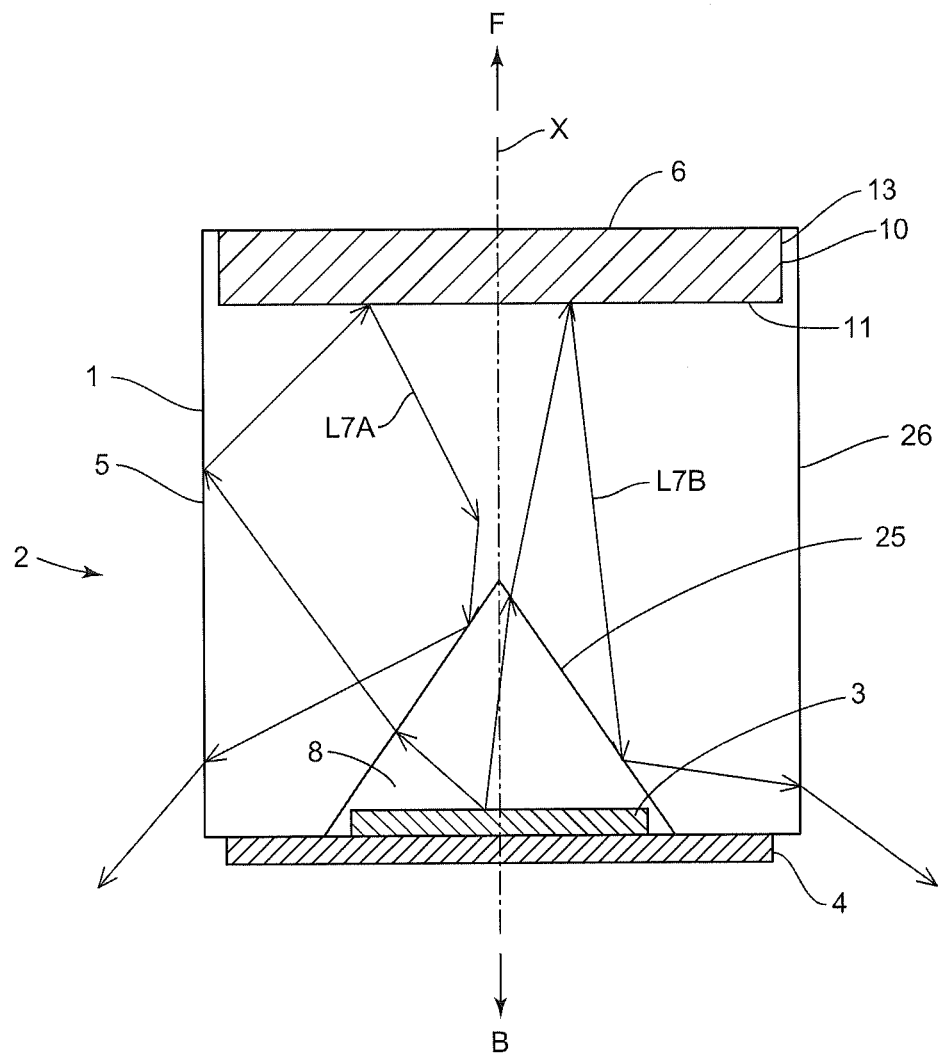
FIG. 25 is a view showing a modified embodiment.

In the light guiding body 1, the light incident surface through which the light emitted from the LED 3 enters the light guide member 5 may be made a light incident surface 25 having a concave surface hollowed in a conical surface-shape toward a side of the light reflecting surface 11 as shown in FIG. 25. By making the light incident surface 25 the conical surface in this manner, it is possible to allow a part of rays reflected by the light reflecting surface 11 to be fully reflected by the light incident surface 25 as rays L7A and L7B to be easily emitted out of the light guide member 5. That is to say, when the light incident surface is made a flat plane as the light incident surface 7 shown in FIG. 26, for example, the light reflected by the light reflecting surface 11 to be incident on the light incident surface 7 passes through the light incident surface 7 and is easily absorbed again to the LED 3 or the LED substrate 4. On the other hand, by making the light incident surface 25 the conical surface, the light reflected by the light reflecting surface 11 to be incident on the light incident surface 25 is easily fully reflected laterally by the light incident surface 25. According to this, it becomes easy to emit the same out of the light guide member 5 and the light distribution angle may be increased.

Figure 27:
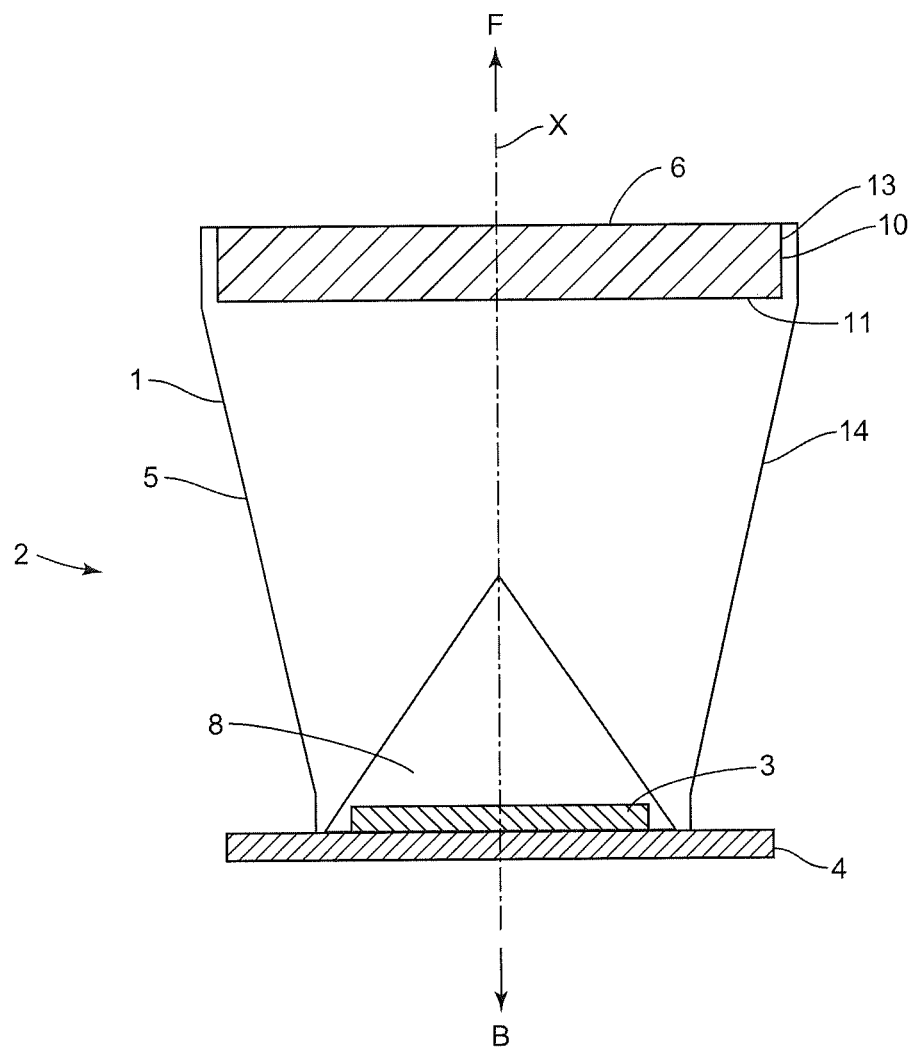
FIG. 27 is a view showing a modified embodiment.

In the light guide member 5, it is preferable that the side surface 14 is inclined as in FIG. 1 and the like as shown in FIG. 27 and that the light incident surface is made the conical surface-shaped light incident surface 25 as shown in FIG. 25. By configuring the light guide member 5 as shown in FIG. 27, a ratio of emission of the light reflected by the light reflecting surface 11 out of the light guide member 5 can be further increased and in addition the light distribution angle may be increased.

The light emitting surface may be made a side surface 26 parallel to the light axis X as shown in FIG. 25. That is to say, the light guide member 5 may be formed into a cylindrical body. Even when the light guide member 5 is the cylindrical body, the light reflected by the light reflecting surface 11 may be easily emitted out of the light guide member 5 by making the light incident surface 25 the conical surface. According to this, the emission efficiency may be improved and the light distribution angle may be increased.

Figure 28:
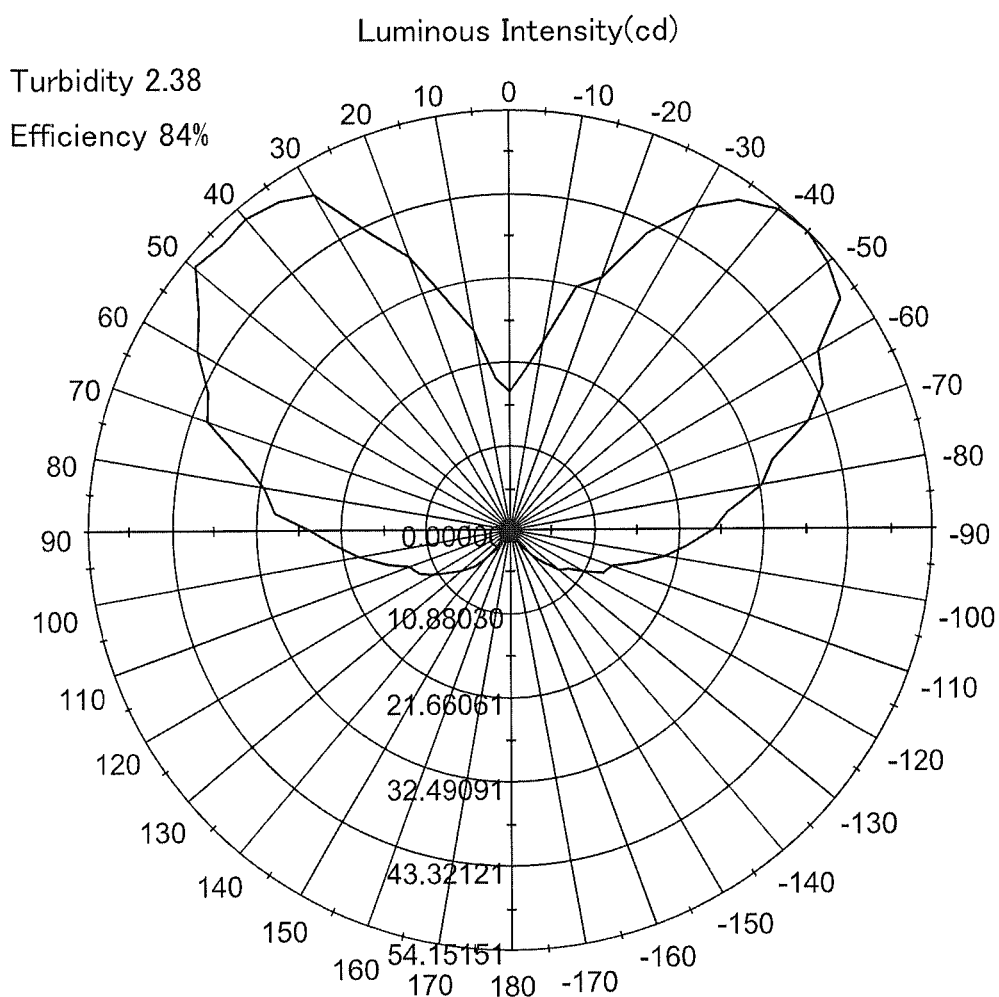
FIG. 28 is a view showing a light distribution angle and luminance distribution of the light guiding body shown in FIG. 25.

FIG. 28 is a graph indicating the light distribution angle and luminance distribution of the light guiding body 1 shown in FIG. 25. In this case, the light guide member 5 is made from colorless and transparent polycarbonate containing spherical light scattering particles of which diameter is 2.4 μm as a light scattering guide material of which turbidity is 2.38 (λ=550 nm). The emission efficiency of 84% is obtained.

Figure 26:
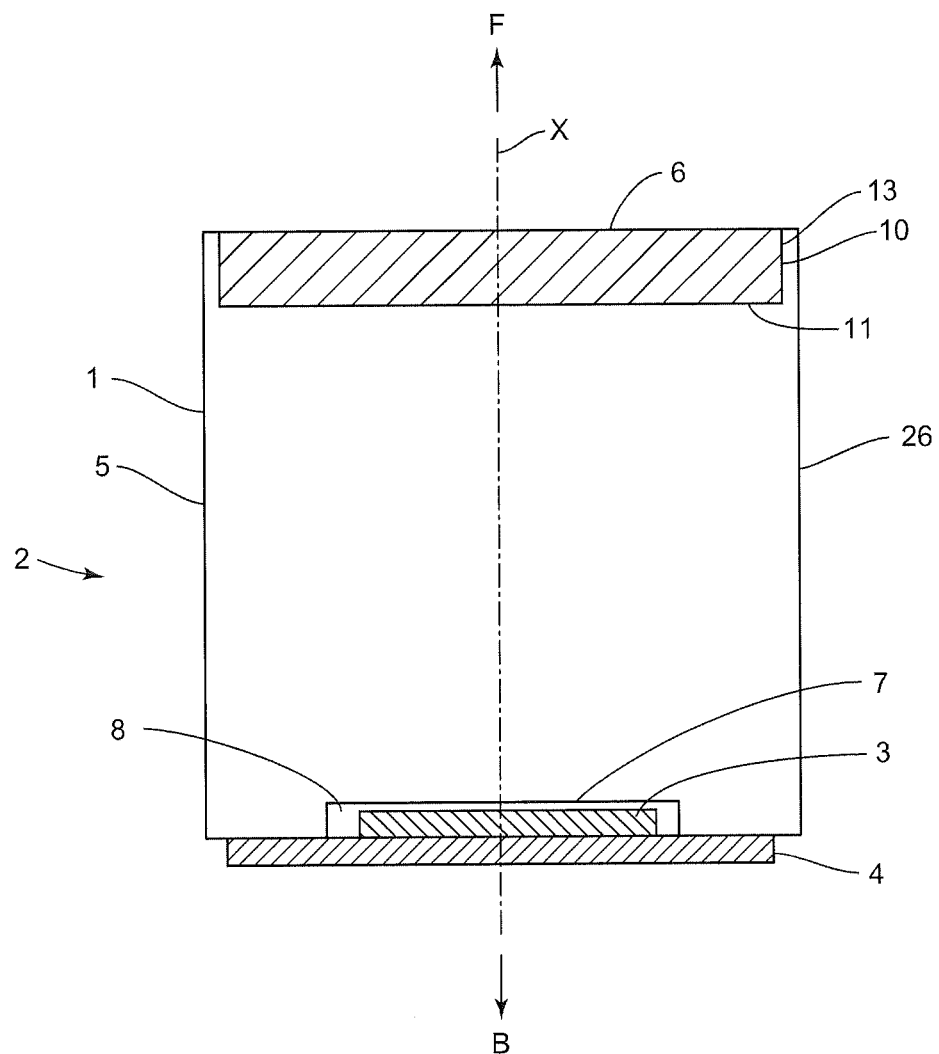
FIG. 26 is a view showing a modified embodiment.
Figure 29:
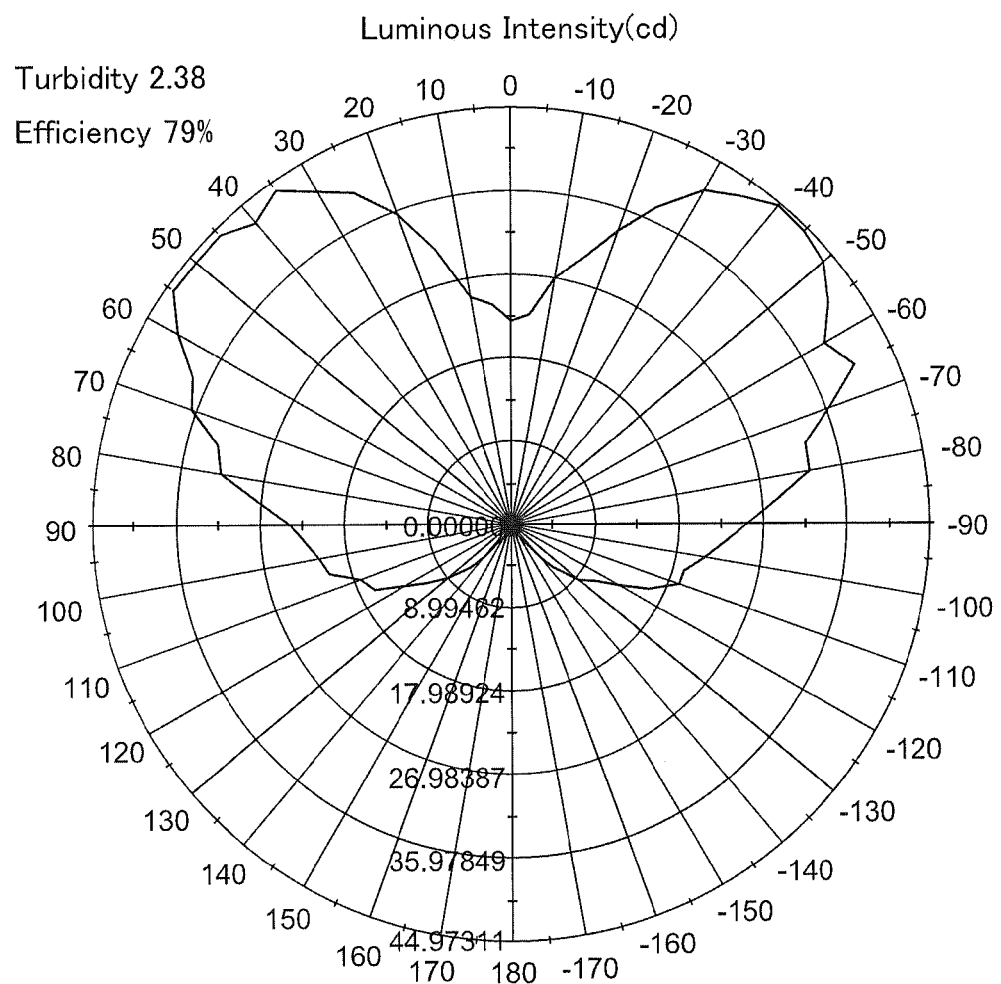
FIG. 29 is a view showing the light distribution angle and luminance distribution of the light guiding body shown in FIG. 26.

FIG. 29 is a graph indicating the light distribution angle and luminance distribution of the light guiding body 1 shown in FIG. 26. In this case, the light guide member 5 is made from colorless and transparent polycarbonate containing spherical light scattering particles of which diameter is 2.4 μm as a light scattering guide material of which turbidity is 2.38 (λ=550 nm). The emission efficiency of 79% is obtained. In the graphs shown in FIGS. 28 and 29, the radiation direction indicates luminance. The direction at the light distribution angle of 0 degree corresponds to the front side of the light emitting device 2 and the direction at the light distribution angle of 180 degrees corresponds to the back side. As the luminance of each light distribution angle, the mean luminance within the range of ±2 degrees is indicated.

Figure 30:
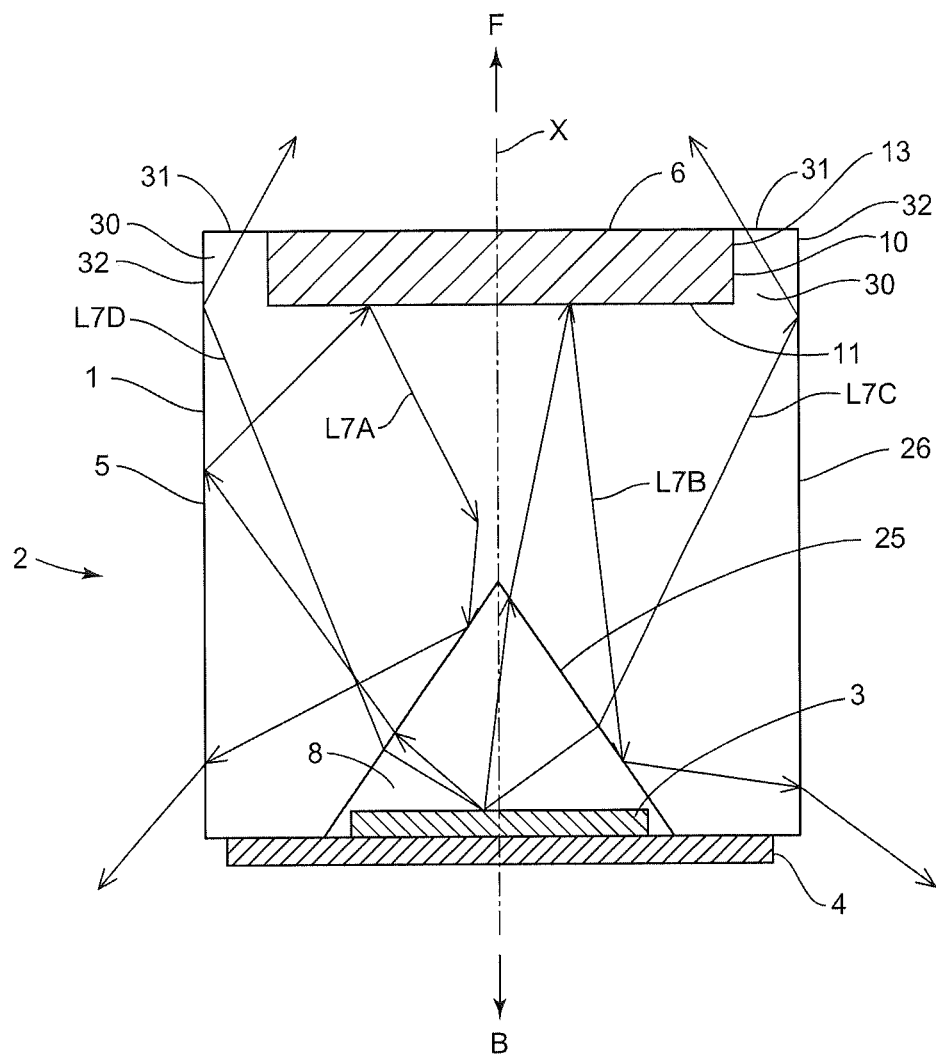
FIG. 30 is a view showing a modified embodiment.

The light guiding body 1 and the light emitting device 2 can be arranged as shown in FIG. 30, in which a circumference light guide portion 30 is provided around the light reflecting surface 6. The same constituents with these of the above mentioned embodiments are referred by the same numerals and explanations of these are omitted in FIG. 30. The circumference light guide portion 30 is connected to the light guide member 5 so that the light emitted into the light guide member 5 passes through the circumference light guide portion 30 to the outside of the light guiding body 1. By the circumference light guide portion 30 being provided, a part of the light entered from the LED 3 into the light guide member 5 is emitted from the opposite side or front face 31 of the circumference light guide portion 30 such as rays L7C and L7D. In the luminance distribution of the light guiding body 1, there may be a tendency that the luminance becomes small in the center side of the light distribution. In the arrangement shown in FIG. 30, however, the light is emitted from the front face 31 of the circumference light guide portion 30 so that the luminance in the center side of the light distribution can be increased and illuminance unevenness can be reduced. Some of the light entered from the LED 3 into the light guide member 5 is emitted from a side face 32, continuous surface of the side face 26, of the circumference light guide portion 30.

Figure 31:
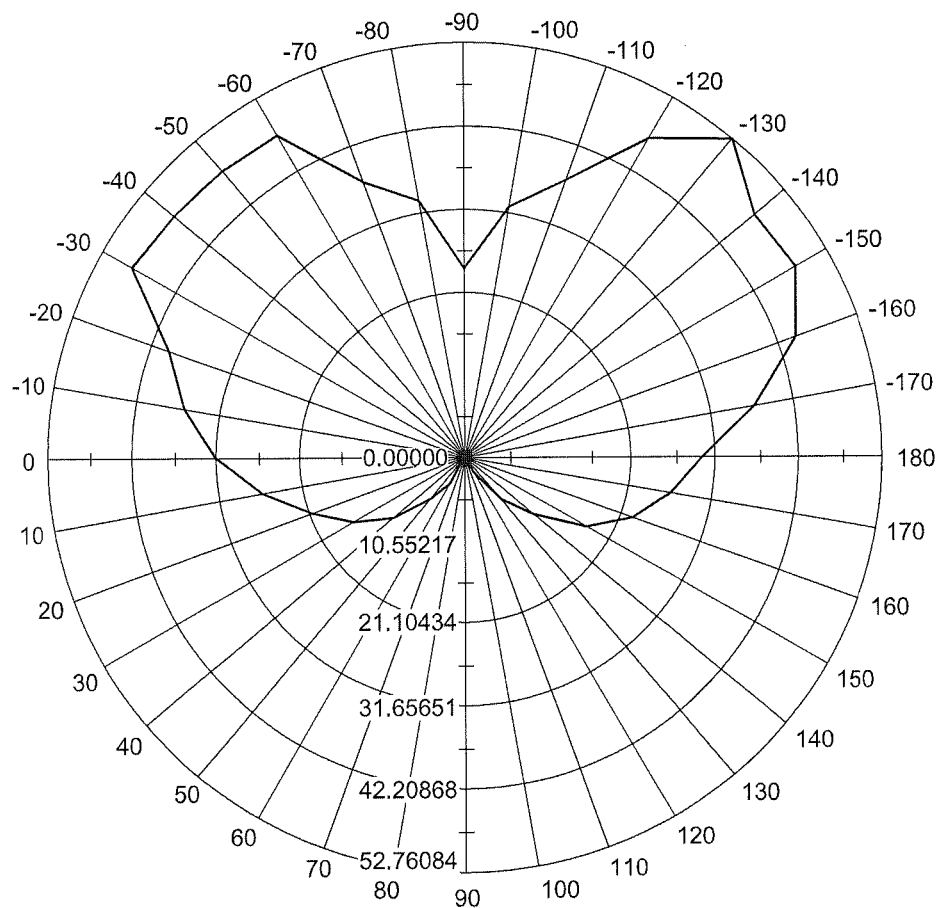
FIG. 31 is a view showing a light distribution angle and luminance distribution of the light guiding body shown in FIG. 30.
Figure 32:
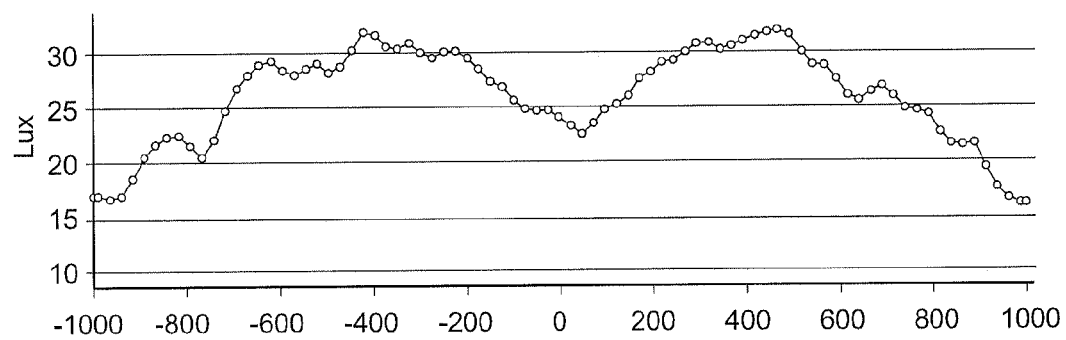
FIG. 32 is a view showing an illuminance distribution of the light emitted from the light guiding body shown in FIG. 30.

FIG. 31 shows a light distribution angle and luminance distribution of the light emitted from the light guiding body shown in FIG. 30 and FIG. 32 shows an illuminance distribution of the light emitted from the light guiding body 30 shown in FIG. 30.

Figure 33:
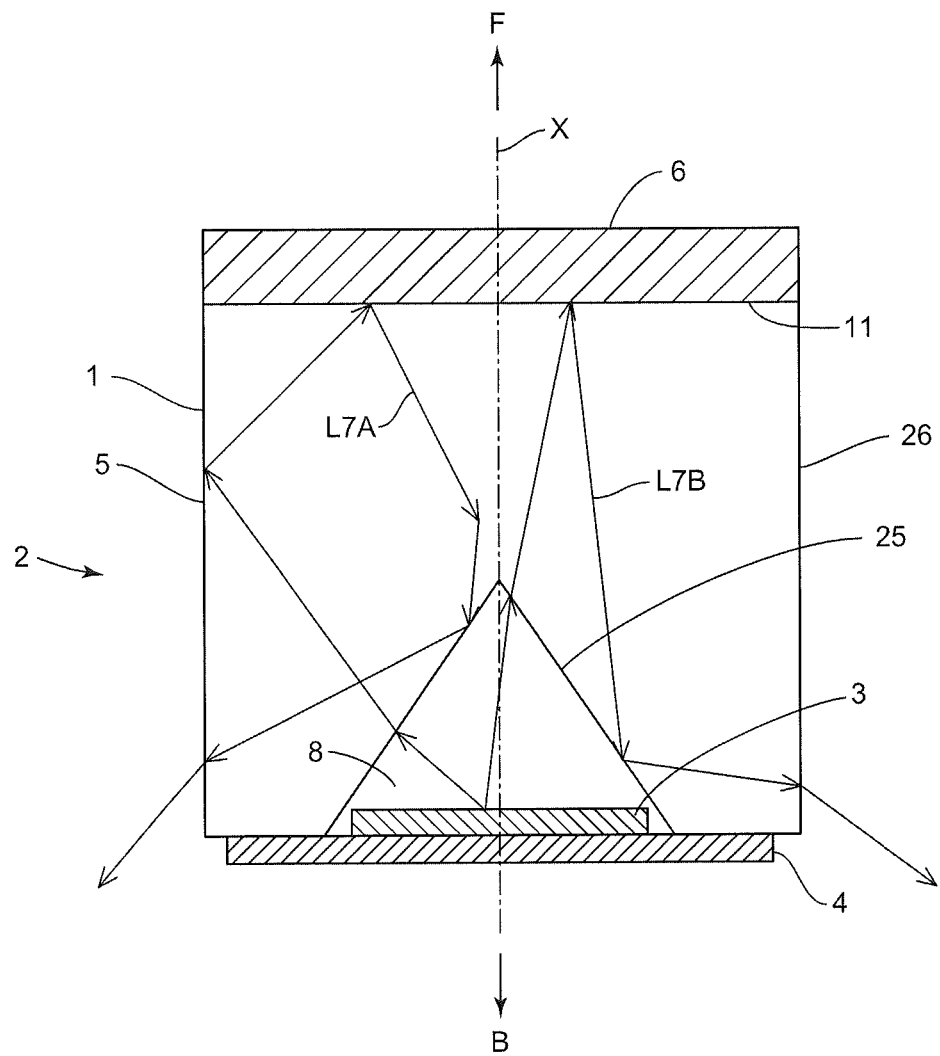
FIG. 33 is a view showing a light guiding body on which the front face of the front side is covered by a light reflecting member.
Figure 34:
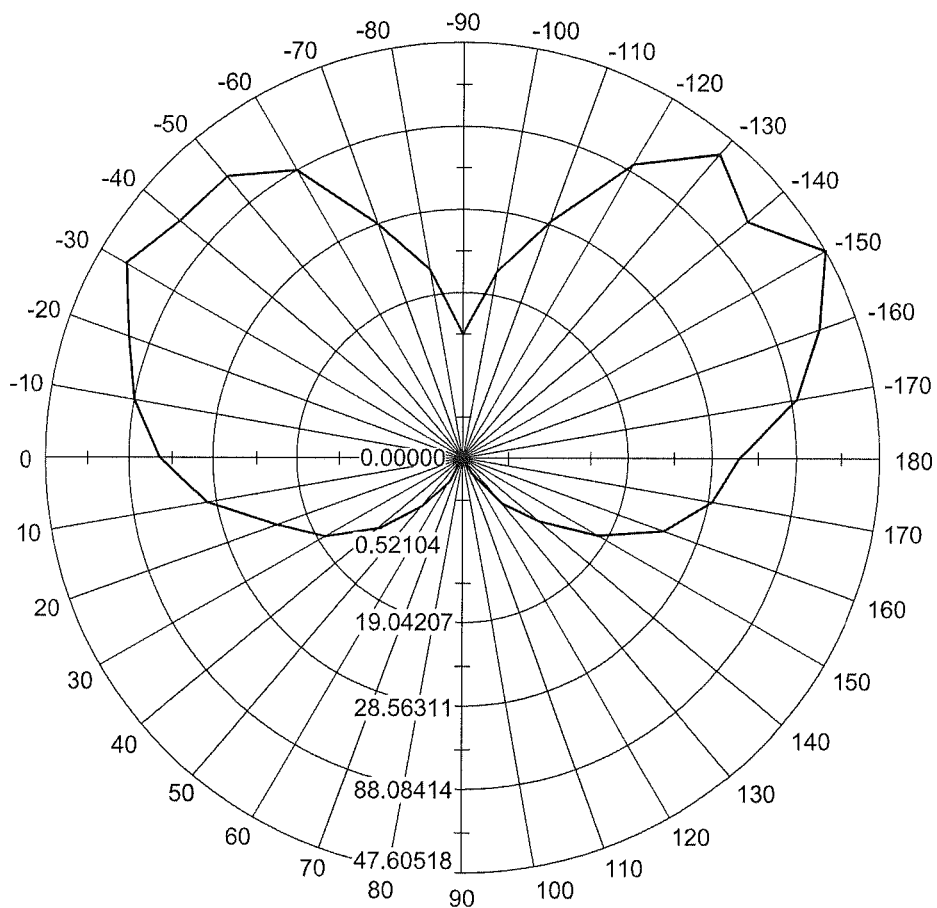
FIG. 34 is a view showing a light distribution angle and luminance distribution of the light guiding body shown in FIG. 33.
Figure 35:
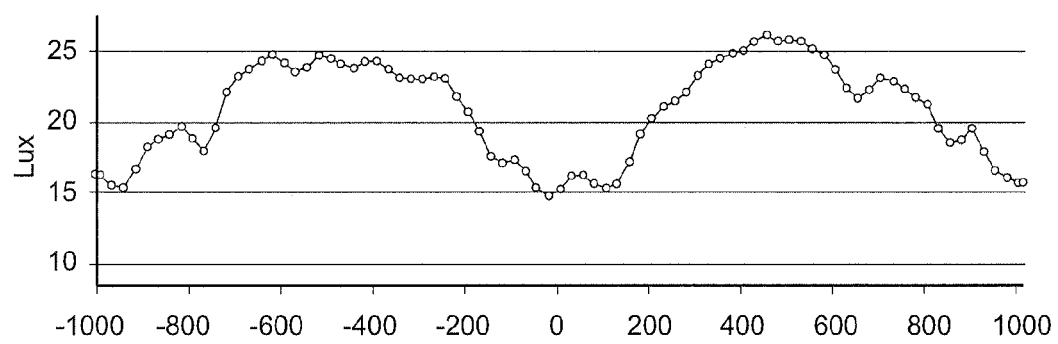
FIG. 35 is a view showing an illuminance distribution of the light emitted from the light guiding body shown in FIG. 33.

FIG. 34 shows a light distribution angle and luminance distribution of the light guiding body 1 on which the front face of the front side is covered by the light reflecting member 6, as shown in FIG. 33. FIG. 35 shows an illuminance distribution of the light emitted from the light guiding body 1 shown in FIG. 33. As shown by comparing FIG. 31 with FIG. 34 and FIG. 32 with FIG. 35, the configuration of the circumference light guide portion 30 being provided makes the luminance of the light guiding body 1 higher in the center side of the light distribution and illuminance unevenness smaller than the configuration of the front face of the front side being covered by the light reflecting member 6 does.

In the light guiding body 1 shown in FIG. 30, light distribution, luminance distribution and illuminance distribution can be made correspond to the area of the front face 31 or the shape of the light emitting face.

Although a surface on the back side of the light reflecting member 6 is formed as the light reflecting surface 11 in each of the above-described embodiments, the light reflecting surface 11 may be formed by evaporating aluminum or by adhering a reflecting tape on the front end surface of the light guide member 5.

What is claimed is:

1. A light guiding body, comprising:
 a light guide member which is formed as a rotational body, the light axis of which is the rotational axis of the rotational body and one end side of which along the light axis is used as a light incident surface; and
 a light reflecting member arranged on another end side of the light guide member opposite to the light incident surface across the light guide member to form a light reflecting surface where a part of the light entering from the light incident surface is reflected; in which:
 the light guide member is formed as a solid body, at least a part of the light guide member is made from light scattering guide material which contains light scattering particles; and
 a side surface of the light guide member between the light incident surface and the light reflecting member forms a light emitting surface, through which light scattered in the light guide member by the light scattering particles passes to outside.

2. The light guiding body according to claim 1, in which: the angle between the light emitting surface and a plane including the light reflecting surface is an acute angle.

3. The light guiding body according to claim 1, in which: the whole of the light guide member is made from the light scattering guide material.

4. The light guiding body according to claim 1, in which: turbidity of the light scattering guide material is not smaller than 0.3 and not larger than 6.5.

5. The light guiding body according to claim 1, in which: the light guide member comprises a light scattering guide layer made from the light scattering guide material and a transparent layer made from transparent material, which does not contain the light scattering particle, and the transparent layer is arranged between the light scattering guide layer and the light incident surface.

6. The light guiding body according to claim 1, in which: the light incident surface is a concave surface hollowed in a conical surface-shape toward the light reflecting surface.

7. The light guiding body according to claim 1, further comprising a circumference light guide portion around the light reflecting member, which is connected to the light guide member and through which the light from the light guide member passes to the outside of the light guiding body.

8. A light emitting device, comprising:
 a light guiding body according to claim 1; and
 a light source which allows light to be incident on the light incident surface of the light guiding body.

9. A light emitting device, comprising:
 a light guiding body according to claim 2; and
 a light source which allows light to be incident on the light incident surface of the light guiding body.

10. A light emitting device, comprising:
 a light guiding body according to claim 3; and a light source which allows light to be incident on the light incident surface of the light guiding body.

11. A light emitting device, comprising:
a light guiding body according to claim 4; and
a light source which allows light to be incident on the light incident surface of the light guiding body.

12. A light emitting device, comprising:
a light guiding body according to claim 5; and
a light source which allows light to be incident on the light incident surface of the light guiding body.

13. A light emitting device, comprising:
a light guiding body according to claim 6; and
a light source which allows light to be incident on the light incident surface of the light guiding body.

* * * * *

UNITED STATES PATENT AND TRADEMARK OFFICE
CERTIFICATE OF CORRECTION

PATENT NO. : 8,646,953 B2  
APPLICATION NO. : 13/345110  
DATED : February 11, 2014  
INVENTOR(S) : Keiichi Mochizuki and Yoshinori Shinohara It is certified that error appears in the above-identified patent and that said Letters Patent is hereby corrected as shown below:

On the title page item (73), Assignee: Koike, Yashuhiro should read: Koike, Yasuhiro Signed and Sealed this
Twentieth Day of May, 2014

Michelle K. Lee
*Deputy Director of the United States Patent and Trademark Office*